US00RE38648E

(19) United States
(12) Reissued Patent
Hirose et al.

(10) Patent Number: US RE38,648 E
(45) Date of Reissued Patent: Nov. 9, 2004

(54) MAGNETO-OPTICAL RECORDING/ REPRODUCING PICKUP HEAD WITH A DIFFRACTION GRATING AND A WOLLASTON PRISM

(75) Inventors: Kazunori Hirose, Tokyo (JP); Mitsuru Kinouchi, Tokyo (JP)

(73) Assignee: TDK Corporation, Tokyo (JP)

(21) Appl. No.: 09/060,877

(22) Filed: Apr. 16, 1998

Related U.S. Patent Documents

Reissue of:
(64) Patent No.: 5,508,992
Issued: Apr. 16, 1996
Appl. No.: 08/314,716
Filed: Sep. 29, 1994

(30) Foreign Application Priority Data

| | | |
|---|---|---|
| Sep. 29, 1993 | (JP) | 5-268364 |
| Oct. 13, 1993 | (JP) | 5-255656 |
| Oct. 13, 1993 | (JP) | 5-255657 |
| Dec. 22, 1993 | (JP) | 5-346417 |

(51) Int. Cl.[7] ..... G11B 7/00
(52) U.S. Cl. ..... 369/112.08; 369/112.17; 369/120; 369/13.32; 369/44.23; 369/44.37
(58) Field of Search ..... 369/13, 109, 112, 369/110, 44.37, 44.23, 120, 112.08, 112.17, 13.32

(56) References Cited

U.S. PATENT DOCUMENTS

| | | | | |
|---|---|---|---|---|
| 5,073,888 A | * | 12/1991 | Takahashi et al. | 369/112 |
| 5,095,472 A | * | 3/1992 | Uchino et al. | 369/44.14 |
| 5,315,574 A | * | 5/1994 | Saimi et al. | 369/109 |
| 5,394,381 A | * | 2/1995 | Fukumoto et al. | 369/13 |

FOREIGN PATENT DOCUMENTS

| | | | |
|---|---|---|---|
| JP | 53-013123 | * | 5/1978 |
| JP | 62-043842 | * | 2/1987 |
| JP | 63-127436 | * | 5/1988 |
| JP | 4-157647 | * | 5/1992 |
| JP | 5-142419 | * | 7/1993 |
| JP | 5-142420 | * | 7/1993 |
| JP | 5-142421 | * | 7/1993 |
| JP | 6-203422 | * | 7/1994 |

OTHER PUBLICATIONS

"O plus E", No. 163, Jun. 1993, pp. 93–98.*

* cited by examiner

*Primary Examiner*—William Korzuch
*Assistant Examiner*—Kim-Kwok Chu
(74) *Attorney, Agent, or Firm*—Oblon, Spivak, McClelland, Maier & Neustadt, P.C.

(57) ABSTRACT

A light source for generating light beams, a diffraction grating for splitting the light beam emitted from the light source into at least three light beams, and an objective lens for receiving the reflecting light beams from the recording medium, the magnification of the objective lens being [−6.0 to] *less than* −12.0, make up a collimatorless optical system. The reflecting light beams emanating from the objective lens are split by a beam splitter, these split light beams are each split into at least three light beams by a Wollaston prism, and are incident on a photo detecting element. A tracking error signal, a focusing error signal, and a magneto-optical signal are generated using the light beams received by the photo detecting element. The beam splitter and the Wollaston prism may be substituted by a multifunctional Wollaston prism. If the nine split light beams are all received by the photo detecting element, the signals produced by the photo detecting element are large in amplitude.

20 Claims, 21 Drawing Sheets

MAGNETO-OPTICAL RECORDING/ REPRODUCING PICKUP HEAD WITH A DIFFRACTION GRATING AND A WOLLASTON PRISM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a pickup device for recording information to and reproducing the same from a magneto-optical recording medium, and also relates to a photo detecting unit in use with the pickup device.

2. Description of the Prior Art

A conventional magneto-optical recording/reproducing system detects a magneto-optical signal by using a magneto-optical light splitting element by utilizing a birefringence, such as a 3-beam Wollaston prism, in an optical system with collimiator, viz., in parallel light beams.

FIG. 1 is a diagram showing an arrangement of a conventional magneto-optical recording/reproducing pickup device. A light beam emitted by a light source 1, such as a semiconductor laser device, is converted, by a diffraction grating 2, into at least three spot light beams which will be used for generating a tracking control signal. These light beams are collimated by a collimating lens 3, usually consisting of two lenses joined together. The collimated light beams are converged on a-magneto-optical disk 6 by an objective lens 5. To reproduce information, the plane of polarization is turned in accordance with an inverted magnetization pattern corresponding to information written into a vertically magnetized film, in a recording track.

The light beams reflected by the magneto-optical disk 6 are rendered parallel by the objective lens 5 and returned to a beam splitter 4. The light beams are reflected by the beam splitter 4 toward a Wollaston prism 7. The Wollaston prism 7 separates the received light beams into an S polarized light component, a P polarized light component, and a light component as the combination of the S and P polarized light components. These polarized light components are incident on a photo detecting unit 12 through a route of a reflecting mirror 8, a converging lens 9, a concave lens 10, and a cylindrical lens 11 for obtaining a focusing error signal. The direction of the magnetization of a readout signal surface is determined by comparing the intensities of the P and S polarized light components. A focusing error signal is obtained, by the astigmatic method, from the light component as the combination of the S and P polarized light components. A tracking error signal is obtained by comparing the intensities of both sub-beams of the three beams derived from the diffraction grating. Thus, the control signals are generated for controlling the focusing and tracking directions.

Another conventional optical pickup device in use with a magneto-optical recording/reproducing apparatus containing the optical system with collimator is disclosed in Unexamined Japanese Patent Publication (Kokai) Sho-63-127436. In the publication, the parallel beams emanating from the collimating lens are optical-axis transformed (reflected) by a polarizing beam splitter. The reflecting light beams are focused on the magneto-optical disk through an objective lens. The reflecting light beams from the magneto-optical disk are converted into parallel light beams by the objective lens. The light beams, after passing through the polarizing beam splitter, are separated, by an analyzer, into an S polarized light component, a P polarized light component, and a light component as the combination of the S and P polarized light components. Finally, a magneto-optical signal and other control signals for controlling the focusing and tracking directions are formed.

The conventional optical pickup devices including the optical system with collimator is employed in order to suppress a variation of the splitting characteristics of the polarizing beam splitter 4 and the Wollaston prism 7, and to reduce a degree of deterioration of the magneto-optical signals. The objective lenses used in parallel light beams can be more easily designed and manufactured than those used in divergent light beams. For this reason, the collimating lens 3, usually consisting of two spherical glass-joined lenses, for collimating the divergent light beams, and the converging lens 9 for converging the parallel light beams are indispensable for the conventional pickup devices. Use of those lenses brings about complexity of the construction, increase of the number of the indispensable parts, and increase of the size of the optical pickup device.

To solve the problems, there is proposed an optical pickup device in use with the magneto-optical recording/reproducing apparatus, which is designed on the basis of an optical system without collimator, as shown in FIG. 2 ("O plus E", No. 163, 1993, June, pp94 to 95). In the optical pickup device, divergent light beams emitted from a light source 1 pass through a convex lens 13 where a degree of the divergence of the divergent light beams is reduced. The light beams as left divergent are incident, as an S polarized light, on a plate polarizing beam splitter 14. The divergent light beams reflected by the plate polarizing beam splitter 14 are converged on the recording surface of the magneto-optical disk 6, through an objective lens 15. The reflecting light beams are converted, the objective lens 15, into the convergent light beams which in turn enter the plate polarizing beam splitter 14. In the plate polarizing beam splitter 14, the polarizing film allows part of the S polarized light beams and most of the P polarized light beams to pass therethrough. A half wave plate 17, located on the rear side of the plate polarizing beam splitter 14, turns the direction of polarization by 45° of the light beam. Thereafter, a plate analyzer 18 splits the light beam into an S polarized light beam, a P polarized light beam, and a light beam as the combination of the S and P polarized light beams. These light beams are converted into electrical signals by a photo detecting unit 19.

In the pickup device shown in FIG. 2, to obtain exact information, it is necessary to accurately adjust the angles of the plate polarizing beam splitter 14 and the plate analyzer 18. This makes the assembling work difficult. Further, a accurate control of the thickness of the plate analyzer 18 is required. Accordingly, the manufacturing work is difficult. The half wave plate 17 is provided for turning the plane of polarization by 45° and for disposing the plate analyzer 18 on a plane without rotating along the optical axis. This half wave plate 17 is expensive. Provision of the half wave plate 17 runs counter to the cost reduction.

Additional pickup devices based on the optical system without collimator are disclosed in Unexamined Japanese Patent Publication (Kokai) Hei-5-142419, Hei-5-142420, and Hei-5-142421. A Wollaston prism 21 as illustrated in FIGS. 3A and 3B is used. The optical system of the optical pickup device is as shown in FIG. 3C. The Wollaston prism 21 as a multifunctional Wollaston prism includes a polarizing beam splitting 21c. The polarizing beam splitting film 21c directs an incident light beam 24, which is emitted from a light source 1, toward the objective lens 15, and allows a reflecting light beam 25, which comes in through the objective lens 15, to pass therethrough. (The polarizing beam splitting film 21c is a multilayer film formed by alternately layering a plural number of dielectric thin films of different refractive indices, and is formed on the incident surface of the Wollaston prism 21.) The Wollaston prism 21 consists of a first prism 21a and a second prism 21b, both being made of crystalline and joined together along their long faces. A plane including the optical axis of the reflecting light beam 25 coming in through the objective lens 15 (the same thing is correspondingly applied to the optical axis of the incident light beam 24 emitted from the light source 1) and the optic axis 21d of the first prism 21a, is at an angle, not a right angle, to a plane including that optical axis and the optic axis 21e of the second prism 21b. The Wollaston prism 21 thus constructed is disposed slanted with respect to the optical axis in the optical path of the reflecting light beams as non-parallel light beams, whereby an astigmatism is caused.

The multifunctional Wollaston prism 21 splits the reflecting light beam 25 into P polarized light beams b, S polarized light beams c, and the light beams a as the combination of the S and P polarized light beams (FIGS. 3B). These light beams a, b, and c are received by photo detecting elements 16a, 16b, and 16c, respectively (FIG. 3C). A signal processor 16d compares the intensities of the light beams b and c, thereby reading information contained in the reflecting light beams. The photo detecting element 16a containing a 4-division photo diode is capable of producing a focusing error signal as will be described later.

The multifunctional Wollaston prism 21, which is slanted to the optical axis, causes an astigmatism, and hence substitutes for the combination of the polarizing beam splitter and the cylindrical lens. Use of this prism contributes to reduction of the number of the required parts. In the Wollaston prism 21, which is constructed such that the optic axis 21d of the first prism 21a is oriented at a right angle to the optical axis of the light beam passing therethrough, the image by the light beam emitted from the prism is not blurred.

In the construction using the multifunctional Wollaston prism 21 as shown in FIG. 3C, the pickup device produces an insufficient amount of output power to a recording medium. The axially positioning adjustment is essential to the photo detecting elements 16a, 16b, and 16c. This adjustment is laborious and difficult.

In writing information to and reading the same from a recording medium by the optical pickup device as described above, the objective lens must be exactly positioned in both the focusing direction and the tracking direction. In the magneto-optical disk as the recording medium, a Kerr rotation of the plane of polarization is read in the form of a magneto-optical signal. The magneto-optical signal is weaker than a pit signal for the compact disk.

The size reduction of the magneto-optical disk system is a recent trend in this field of the products. The pickup device in use with the magneto-optical disk system is also under a constant pressure of size reduction. In this circumstance, a unique optical pickup device has been proposed (Unexamined Japanese Patent Publication (Kokai) Hei-4-157647). In the pickup device, the combination of a diffraction grating and a 3-beam Wollaston prism, as already described, is used so as to allow a single photo detecting element to receive the reflecting light beams and to pick up thereof information recorded in the magneto-optical disk (in the form of magneto-optical signals), a focusing error signal indicative of a positional deviation (defocusing quantity) in the focus direction, and a tracking error signal indicative of a positional deviation in the track direction.

In this pickup device, three split light beams, the light beam of the 0-th order of diffraction, and the light beams of ±1st order of diffraction are incident on the recording layer of the magneto-optical disk. The reflecting light beams R0, R1, and R2 from the recording layer are applied to the 3-beam Wollaston prism 101 as shown in FIG. 4. The 3-beam Wollaston prism 101 further splits each of these reflecting light beams into three reflecting light beams in a direction perpendicular to the separation of the diffraction grating. Totally nine reflecting light beams R0, R1, R2, R10, R11, R12, R20, R21, and R22 are produced. Of those nine reflecting light beams, five light beams R0, R1, R2, R10, and R20 are detected by a single photo detecting unit 102 (FIG. 5). The result of the detecting is used for generating a focusing error signal, a tracking error signal, and a magneto-optical signal.

The conventional photo detecting unit 102 includes detecting elements 103, 106 and 107 for detecting the light beams R0, R1, and R2 corresponding to those of the 0th order and ±1st order of diffraction, which are split by the diffraction grating, and detecting faces 104 and 105 for detecting the light beams R10 and R20, which are split by the 3-beam Wollaston prism 101. The photo-detecting elements 103, 106 and 107 for the light beams R0, R1, and R2 are disposed at a right angle to the photo-detecting elements 104 and 105 for the light beams R10 and R20.

As seen, the reflecting light beams R11, R12, R21, and R22, located at four corners, are not used in the conventional pickup device. The ratio of the quantities of the 0th order to ±1st order of diffraction, caused by the grating, is set at a relatively small value within a range from 4 to 8, in order to increase the amplitude of the tracking error signal. The 3-beam Wollaston prism of which the basic split-light quantity ratio by the 3-beam Wollaston prism, i.e., ordinary ray:ray as the combination of ordinary ray and extraordinary ray:extraordinary ray, is 25:50:25, is frequently used. The quantity of each of the ordinary and extraordinary rays is the half of that of the combination of the ordinary and extraordinary rays. The magneto-optical signal (ordinary ray intensity—extraordinary ray intensity) is relatively weak.

In the above-mentioned optical pickup device, the reflecting light beams R11, R12, R21, and R22, located at four corners, are not used. Because of this, the tracking error signal is weaker than those by the light beams including those at the four corners. Since the ratio of the quantities of the light of the 0-th order of diffraction to the light of the ±1st order of diffraction, caused by the grating, is not large, the resultant focusing error signal and the magneto-optical signal are not large in amplitude. With regard to the basic split-light quantity ratio by the 3-beam Wollaston prism, the beam intensity ratio in the central part is large, while that on both sides is the half of that in the central part. The resultant magneto-optical signal is not large in amplitude.

A cubic beam splitter and a cylindrical lens are usually used in the conventional optical pickup device. The direction of the beam splitting by the grating is at a right angle to that of the beam splitting by the 3-beam Wollaston prism. Accordingly, the photo detecting unit is constructed such that the photo detecting elements for the tracking error signal are arrayed at right angles to the photo detecting elements for the magneto-optical signal.

Use of the cubic beam splitter and a cylindrical lens inevitably increases the number of components and the size of the optical pickup device.

To cope with this, there is proposed an optical pickup device which uses a plate beam splitter with an astigmatism causing function (for generating a focusing error signal) for size reduction purposes ("O plus E", No. 163, pp93 and 94). A diffraction grating is not used in this optical pickup system. The conventional photo detecting unit of the type in which the photo detecting elements for the tracking error signal is disposed at a right angle to the photo detecting elements for the magneto-optical signal, is improperly operable when it is applied to the optical pickup system using the diffraction grating and the plate beam splitter. If applied, it fails to produce desired signals.

SUMMARY OF THE INVENTION

Accordingly, a first object of the present invention is to provide a magneto-optical recording/reproducing pickup device which includes an optical system without collimator, and has various advantages, such as a decreased number of necessary parts, a simple construction, the requirements for the parts layout accuracy being not so high when comparing with optical pickup device using the plate analyzer, a simple assembling work, and use of a Wollaston prism, easily available, being allowed.

A second object of the present invention is to provide a magneto-optical recording/reproducing pickup device which is small in size and low in cost with a decreased number of required parts by unification of the Wollaston prism, beam splitter, and an astigmatic generator element. Furthermore, the pickup device produces an increased output power to a recording medium, and allows an easy positioning of the photo detecting element on the optical axis, and an easy designing of the objective lens by use of a positive singlet.

A third object of the present invention is to provide a photo detecting unit which produces tracking signal having large amplitude.

A fourth objective of the present invention is to provide an optical pickup device using the photo detecting element of the third object.

A fifth object of the present invention is to provide a photo detecting unit which uses a plate beam splitter with an astigmatism causing function, and is well adaptable for an optical system in which the direction of the beam splitting by the grating is at an angle, not a right angle, to that of the beam splitting by the 3-beam Wollaston prism.

A sixth objection of the present invention is to provide an optical pickup device using the photo detecting unit of the fifth object.

According to first aspect of the invention, the magneto-optical recording/reproducing pickup device comprises: a light source for generating light beams; a diffraction grating for splitting the light beam emitted from the light source into at least three light beams; an objective lens for converging the light beams emitted from the light source on a magneto-optical recording medium, and receiving the reflecting light beams from the recording medium, the magnification of the objective lens being −6.0 to −12.0 when an object point lies at the signal surface of the magneto-optical recording medium; a beam splitter for separating the light beams coming from the light source and incident on the objective lens from the light beams coming through the objective lens; a Wollaston prism for splitting the reflecting light beams coming from the magneto-optical recording medium through the beam splitter; and a photo detecting unit including a plural number of photo detecting elements for detecting the light beams emanating from the Wollaston prism. In the first magneto-optical recording/reproducing pickup device, a positive singlet for reducing a degree of divergence of the diverging light beams from the light source may be provided between the light source and the objective lens.

In the first magneto-optical recording/reproducing pickup device, an optical system without collimator in which a degree of convergence of the light beams incident on the beam splitter and the Wollaston prism is reduced can be constructed when the objective lens having the magnification within the above range of figures is used. The optical system of the optical pickup device may be constructed as an optical system without collimator by using the objective lens of that magnification, not collimating the light beams emitted from the light source. With this optical system, the optical pickup device succeeds in suppressing a variation of the splitting performances by the beam splitter and the Wollaston prism, and reducing a degree of deterioration of the magneto-optical signal. Further, the maximum value of the wavefront aberration measured on condition that the objective lens is moved in the tracking and the focusing direction becomes smaller, the larger a value of the magnification $\beta$ is, as shown in FIG. 29. When the magnification is −6 or greater, it is easy to form an optical system which satisfies the criterion value 0.07 $\lambda$ of Marechal. A distance from a light source to a converging point on the disc, viz., the entire length of the optical path ((L1+L2) in FIG. 6B), becomes longer, the larger the magnification $\beta$ is. If a distance L1 from the converging point to the principal point is 3 mm or a bit longer, the total length of the optical path is approximately 40 mm when the magnification is −12. If the magnification exceeds this value, the total length of the optical path becomes large.

For disposing the Wollaston prism, the incident plane thereof is merely set perpendicular to the optical axis of the incident light beams. Moreover, the Wollaston prism may be disposed on a plane, and there is no need of using a polarization angle turning means, such as a half-wave plate. With provision-of the positive singlet between the light source and the objective lens, the distance between the light source and the objective lens is reduced. This leads to the size and cost reduction of the optical pickup device, and an efficient use of the light beam emitted from the light source. For the aberration correction, the positive singlet may be used in addition to the objective lens. This indicates an easy aberration correction of the optical system of the pickup device.

According to the second aspect of the invention, the magneto-optical recording/reproducing pickup device comprises: a light source for generating light beams; a diffraction grating for splitting the light beam emitted from the light source into at least three light beams; an objective lens for converging the light beams emitted from the light source on a magneto-optical recording medium, and receiving the reflecting light beams from the recording medium, the magnification of the objective lens being −6.0 to −12.0 when an object point lies at the signal surface of the magneto-optical recording medium; a Wollaston prism for causing an astigmatism including a polarizing light splitting film for separating the light beams coming from the light source and incident on the objective lens from the light beams coming through the objective lens, the Wollaston prism being composed of first and second crystalline prisms which are joined, a plane including the optical axis of the reflecting light beam coming in through the objective lens and the optic axis of the first prism, is at an angle, not a right angle, to a plane including that optical axis and the optic axis of the second prism, the Wollaston prism is disposed in the optical path of the reflecting light beams as light beams being convergent and not parallel in a state that the incident plane thereof is slanted with respect to the optical axis, whereby causing an astigmatism, a positive single provided between the light source and the objective lens, the total magnification of the optical system including the objective lens and the positive singlet being −0.3 to −6.0; and a photo detecting unit including a plural number of photo detecting elements for detecting the light beams emanating from the Wollaston prism.

In the second magneto-optical recording/reproducing pickup device, the diffraction grating and the positive singlet may be formed in a single construction.

In the second magneto-optical recording/reproducing pickup device, a collimatorless optical system in which a degree of convergence of the light beams incident on the Wollaston prism is reduced can be constructed when the objective lens having the magnification within the above range of figures is used. A degree of divergence of the divergent light beams emitted from the light source is reduced by the positive singlet, the optical path length is reduced, and an output power of the optical pickup device to the object is increased. The optical system of the optical pickup device may be constructed as an optical system without collimator by using the objective lens of that magnification. With this optical system, the optical pickup device succeeds in suppressing a variation of the splitting performances by the beam splitter and the Wollaston prism, and reducing a degree of deterioration of the magneto-optical signal. The Wollaston prism is disposed in the optical path of the reflecting light beams in a state that the incident plane thereof is slanted with respect to the optical axis, whereby causing an astigmatism. For the aberration correction, the positive singlet may be used in addition to the objective lens. This indicates an easy aberration correction of the optical system of the pickup device. The light beams may be focused on the photo detecting unit by moving the positive singlet along the optical axis. When the diffraction grating and the positive singlet may be formed in a single construction, the turning of the diffraction grating or the positioning of the positive singlet along the optical axis may be adjusted by a single operation means. Further, the maximum value of the wavefront aberration measured on condition that the objective lens is moved in the tracking and the focusing direction becomes smaller, the larger a value of the total magnification β' is, as shown in FIG. 30. When the magnification is selected to be −3 or greater, it is easy to form an optical system which satisfies the criterion value 0.07 λ of Marechal. The main beam power to the disk becomes smaller, the larger the total magnification β' is. The reason for this is that when the total magnification is large, the quantity of light beams entering the optical system from a light source is reduced. If the total magnification is −6 or smaller, the main beam power to the disk is 0.5 mW (the criterion value of MD) or larger.

To achieve the third object, there is provided a photo detecting unit for receiving the reflecting light beams formed in a manner that a light beam is split into at least three light beams of the 0-th order and the ±1st order of diffraction by a diffraction grating, the split light beams are incident on a recording medium, the light beams reflected on the recording medium are each split into at least three light beams by a Wollaston prism, the photo detecting unit comprising: a first photo detecting element for receiving the light beams of the +1st order of diffraction; and a second photo detecting element for receiving the light beams of the −1st order of diffraction.

According to the fourth aspect of the invention, the magneto-optical recording/reproducing pickup device comprises: a light source for generating light beams; a diffraction grating for splitting the light beam emitted from the light source into at least three light beams of the 0-th order and the ±1t order of diffraction; an objective lens for converging the light beams split by the diffraction grating on a recording medium, and receiving the reflecting light beams from the recording medium; a Wollaston prism for splitting the reflecting light beams coming in through the objective lens into at least three light beams, a photo detecting unit for receiving at least nine reflecting light beams from the Wollaston prism, the photo detecting unit including a first photo detecting element for receiving at least three light beams split by the Wollaston prism of the +1st order of diffraction, a second photo detecting element for receiving at least three light beams split by the Wollaston prism of the −1st order of diffraction, a third photo detecting elements, consisting of a plural number of photo detecting elements, for receiving in divided form the central light beam of the three light beams split by the Wollaston prism of the 0-th order of diffraction, and a pair of fourth photo detecting elements for receiving respectively the reflecting light beams located on both sides of the central reflecting beam of the three light beams split by the Wollaston prism of the 0-th order; and lens drive means for driving the objective lens for positioning adjustment.

In the fourth optical pickup device of the present invention, a tracking error signal, for example, may be formed by calculating the difference between the output signals of the first and second photo detecting elements of the photo detecting unit. Since at least three reflecting light beams together are incident on the first and second photo detecting elements, the tracking error signal generated is large in amplitude. A focusing error signal, for example, may be formed by the output signals of the divided photo detecting elements of the third photo detecting element. A magneto-optical signal, for example, may be formed by calculating the difference between the paired fourth photo detecting elements.

Furthermore, when the ratio of the quantities of the 0th-order light to the ±1st order of light is set at 8.5 or larger, the amplitude of the focusing error signal and magneto-optical signal may be increased. However, if it exceeds 15, the amplitude of the tracking error signal is too small. Therefore, a preferable ratio of the quantities of the 0th-order light to the ±1st order of light is within the range of 8.5 to 15. At the ratio within this range, the magneto-optical signal and the focusing error signal may be increased in amplitude in a state that the tracking error signal is not too small in amplitude.

Moreover, the Wollaston prism for splitting the received light beam into ordinary ray, extraordinary ray, and the light beam as the combination of the ordinary ray and extraordinary ray, is constructed such that the ratio of the quantities of the ordinary ray and the extraordinary ray to the whole light quantity is within 30 to 45%. When using such a Wollaston prism, the produced magneto-optical signal is large. When the photo detecting unit of the invention is further used, the tracking error signal is also large. If the ratio of the quantities of the ordinary ray and the extraordinary ray to the whole light quantity exceeds 45%, the focusing error signal is too weak.

A photo detecting unit, which achieves the fifth object of the present invention, receives at the photo detecting elements the light beams of at least 3 by 3 in the form of a parallelogram, the received reflecting light beams being formed in a manner that a light beam is split into at least three light beams of the 0-th order and the ±1-st order of diffraction by a diffraction grating, the split light beams are each split into at least three light beams by a Wollaston prism, the photo detecting element includes a first photo detecting element for receiving the light beams of the ±1st order of diffraction, a second photo detecting element for receiving the light beams of the −1st order of diffraction, a third photo detecting element, consisting of a plural number of photo detecting elements, for receiving in divided form the central light beam of the three light beams of the 0-th order of diffraction, and a pair of fourth photo detecting elements for receiving respectively the reflecting light beams located on both sides of the central reflecting beam of the three light beams split by the Wollaston prism of the 0-th order, an angle between a line connecting the centers of the first and second photo detecting elements and a line between the paired fourth photo detecting elements are not a right angle.

According to the sixth aspect of the invention, the magneto-optical recording/reproducing pickup device comprises: a light source for generating light beams; a diffraction grating for splitting the light beam emitted from the light source into at least three light beams of the ±1st order of diffraction and the light beam of the 0-th order of diffraction; an objective lens for converging the light beams split by the diffraction grating on the recovery surface of a magneto-optical recording medium, and receiving the reflecting light beams from the recording medium, a Wollaston prism for splitting each of the reflecting light beams coming in through the beam splitter into at least three light beams, the direction of the splitting by the Wollaston prism being at an angle to the direction of the splitting by the diffraction grating; a photo detecting unit for receiving at least nine reflecting light beams from the Wollaston prism, the photo detecting unit including a first photo detecting element for receiving the light beams of the +1st order of diffraction, a second photo detecting element for receiving the light beams of the −1st order of diffraction, a third photo detecting element, consisting of a plural number of photo detecting elements, for receiving in divided form the central light beam of the three light beams of the 0-th order of diffraction, and a pair of fourth photo detecting elements for receiving respectively the reflecting light beams located on both sides of the central reflecting beam of the three light beams split by the Wollaston prism of the 0-th order, an angle between a line connecting the centers of the first and second photo detecting elements and a line between the paired fourth photo detecting elements being not a right angle; and lens drive means for driving the objective lens for positioning adjustment.

In the photo detecting unit, an angle between a line connecting the centers of the first and second photo detecting elements and a line between the paired fourth photo detecting elements is not a right angle. Accordingly, the photo detecting element is well adaptable for an optical system in which the direction of the splitting by the diffraction grating using the plate beam splitter capable of causing an astigmatism is at an angle, not a right angle, to the direction of the splitting by the Wollaston prism.

DETAILED DESCRIPTION OF THE PREFERRED EMBODIMENTS

Figure 6A:
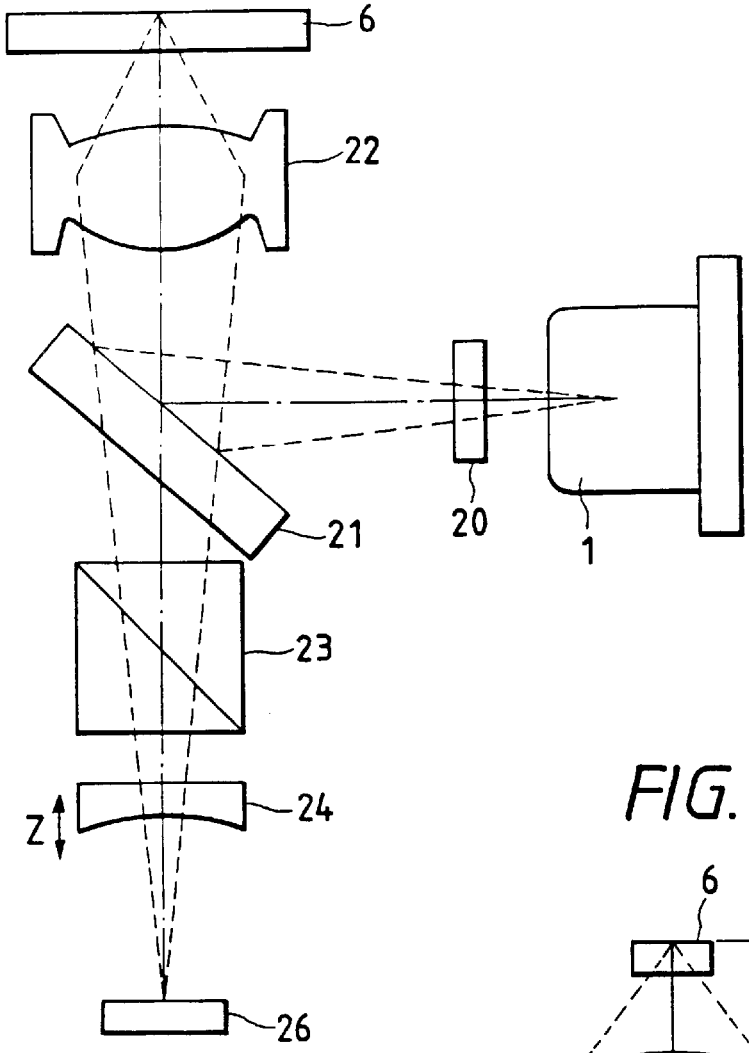
FIG. 6A is a diagram showing a magneto-optical pickup device according to a first embodiment of the present invention.

FIG. 6A is a diagram showing a magneto-optical pickup device according to a first embodiment of the present invention. In the figure, reference numeral 1 designates a light source as a semiconductor laser device; 20, a plane grating; 21, a plane polarizing beam splitter; 22, an objective lens; 23, a 3-beams Wollaston prism; 26, a photo detecting unit; and 24, a concave lens movable in the optical axis as indicated by arrows z so as to focus the reflecting light beams on the photo detecting unit 26.

The plane grating 20 receives light beams from the light source 1 and generates a main beam and two subbeams located on both sides of the main beam, which are to be incident on the signal surface of the magneto-optical disk. These main and subbeams are used for forming a tracking error signal. The plane polarizing beam splitter 21 receives the divergent light beams coming through the plane grating 20 from the light source 1, and directs the divergent light beams toward the objective lens 22. The objective lens 22 converges the reflecting light beams on the signal surface of the magneto-optical disk 6. On the signal surface of the magneto-optical disk 6, the plane of polarization of the incident light beam is turned in accordance with a magnetization pattern representative of information recorded in a vertically magnetized film. The reflecting light beams with the turned plane of polarization from the magneto-optical disk 6 pass through the objective lens 22, and are incident, in the form of the convergent light beams, on the plate polarizing beam splitter 21. The plate polarizing beam splitter 21 allows a part (e.g., 30%) of the S polarized light and most (e.g., 95%) of P polarized light to pass therethrough.

Figure 7A:
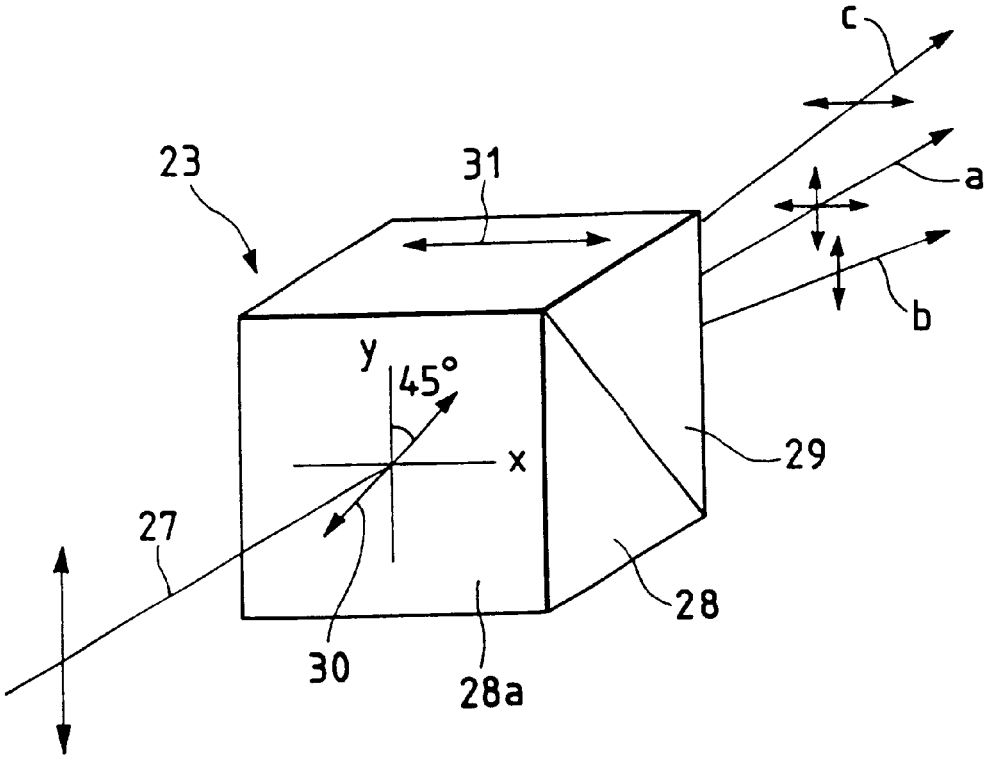
FIG. 7A is a perspective view showing a 3-beams Wollaston prism that may be used for the pickup device of FIG. 6A.

The 3-beam Wollaston prism as disclosed in Unexamined Japanese Patent Publication (Kokai) Sho-63-113503 is used for the Wollaston prism 23. As shown in FIG. 7A, the Wollaston prism 23 is formed by joining together prisms 28 and 29 made of calcite or quartz, lithium niobate, etc. along their long faces. A plane including the optical axis 27 of incident light and the optic axis 30 of the crystal prism 28 is at an angle other than a right angle to a plane including the optical axis 27 and the optic axis 31 of the crystal prism 29. The Wollaston prism 23 thus constructed receives the incident light beam and splits it into a light beam a as the combination of an ordinary light beam and an extraordinary light beam, an ordinary light beam b and an extraordinary light beam c, both being slanted at angles to the incident light beam.

Figure 7B:
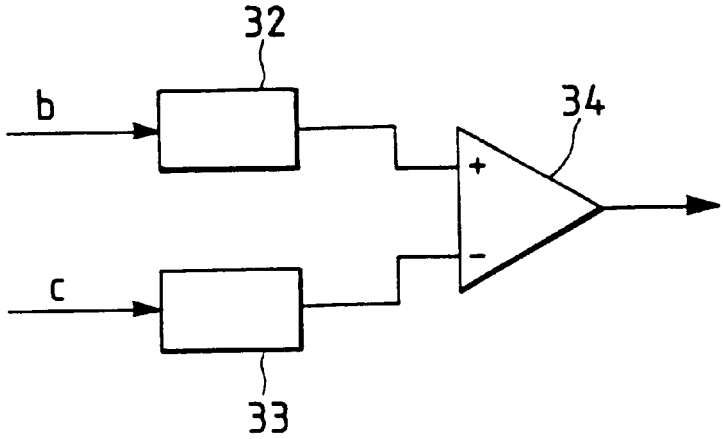
FIG. 7B is a block diagram showing a readout signal determining circuit coupled for reception with the Wollaston prism.

Under the condition that the rotation angle between the optic axis 30 of the crystal prism 28 and the optic axis 31 of crystal prism 29 is 45°, as shown in FIG. 7A, the intensities Ia, Ib, and Ic of the light beams a, b, and c on the photo detecting unit are respectively 50%, 25% and 25% of the intensity of the incident light beam when the plane of polarization of the reflecting light beam on the disk surface is not rotated. These light intensities Ia and Ib are: Ib>25% and Ic<25% or Ib<25% and Ic>25% depending on the rotation direction of the plane of polarization of the reflecting light beam on the disk surface. As seen, information recorded in the magneto-optical disk can be discriminated by utilizing this nature, for example, by using a circuitry as shown in FIG. 7B. In the figure, the light intensities Ib and Ic are detected by detectors 32 and 33 and then is compared by a comparator 34.

Figure 8A:
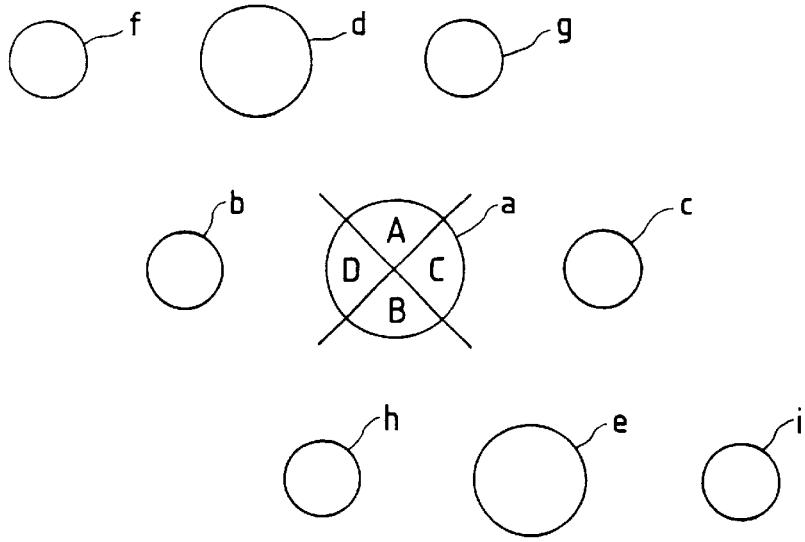
FIG. 8A is a diagram showing a distribution of light beams on a photo detecting unit in the optical pickup device.
Figure 8B:
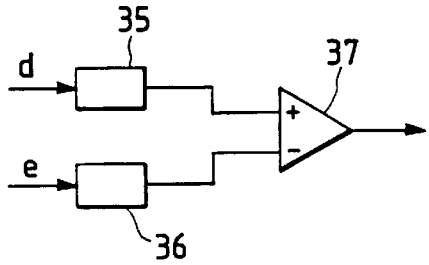
FIG. 8B is a block diagram showing a tracking error detect circuit.

A distribution of light beams on the photo detecting unit 26 in the optical pickup device is as shown in FIG. 8A. In the figure, light beams a, b, and c result from the splitting of the main beam by the Wollaston prism 23, and light beams f and q, and hand i result from the splitting of the subbeams d and c by the Wollaston prism 23. The tracking error signal is formed by the known circuitry as shown in FIG. 8B. In this circuitry, the intensities of the subbeams e and e are detected by detectors 35 and 36, and the detected signals are compared by a comparator 37. A tracking control signal is formed by using this tracking error signal. The control signal controls the movement of the objective lens 22 in the radial direction of the disk 6 so that the light beam is irradiated on a track.

Figure 8C:
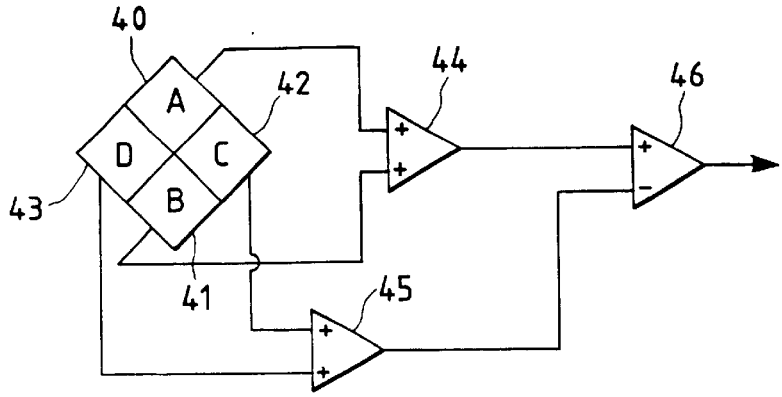
FIG. 8C is a block diagram showing a focusing error detect circuit coupled for reception with a photo detecting element for detecting a light beam a in the photo detecting unit.

In the photo detecting unit 26, a photo detecting portion thereof for receiving the light beam a is divided into four parts A to D as shown in FIG. 8C. Photo detectors 40 to 43 are respectively located in these detecting elements A to D, which correspond to segmental parts A to D of the spot of the light beam a in FIG. 8A. The signals derived from the photo detectors 40 to 43 are processed by operational circuits 44 to 46, whereby a focusing error signal (A+B)−(C+D) is produced. This method for focusing error detection is known.

The focusing error signal is used for controlling the axial movement of the objective lens 22 so that the light beams are always focused on the recording surface of the disk. According to this embodiment, the plate polarizing beam splitter 21 serves also as a cylindrical lens. When the focal point lies on the signal surface of the disk, the spot of the light beam a is circular, and the focusing error signal (A+B)−(C+D) represents zero (0). In another state or a defocusing state, the focusing error signal takes a negative or positive value. The focusing error signal may also be obtained by a critical angle method, a knife edge method, a Foucault method, or a beam size method.

Figure 6B:
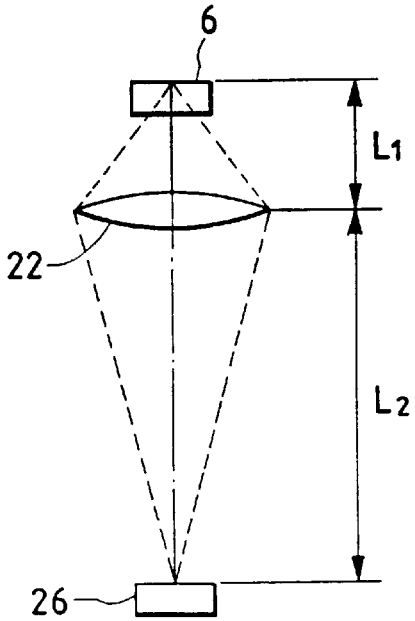
FIG. 6B is an explanatory diagram for explaining a magnification of an optical system including an objective lens, a magneto-optical disk, and a photo detecting unit in the optical pickup device.

To construct the optical pickup device as mentioned above, a magnification L2/L1 of the optical system including the objective lens 22, the magneto-optical disk 6, and the photo detecting unit 26 is selected to be preferably within −6.0 to −12.0, more preferably within −7.0 to −9.0 (FIG. 6B). L1 is the distance between the object point and the front principal point of the objective lens 22. The object point (the converging point of the light beam by the objective lens 22) is set at the signal surface of the disk 6. L2 is the distance between the image point and the rear principal point of the objective lens 22. In the conventional optical pickup device for the optical disk, for example, compact disk, an optical system without collimator having the magnification of approximately −4.0 to −6.0 is employed. However, in this range of the magnification, some disadvantages arise. For example, the light splitting characteristics of the plate polarizing beam splitter 21 varies although that of the plate non-polarizing beam splitter utilizing in the conventional optical disk varies little. The magneto-optical signal is deteriorated in quality in the Wollaston prism 23. For this reason and an easy aberration correction, the preferable magnification is −6.0 or larger (as absolute value) for this type of the optical pickup device which cannot produce a large readout signal. In view of miniaturization, −12.0 or larger of the magnification is unpractical since such a value elongates the length ranging from the magneto-optical disk 6 to the photo detecting unit 26.

Figure 9:
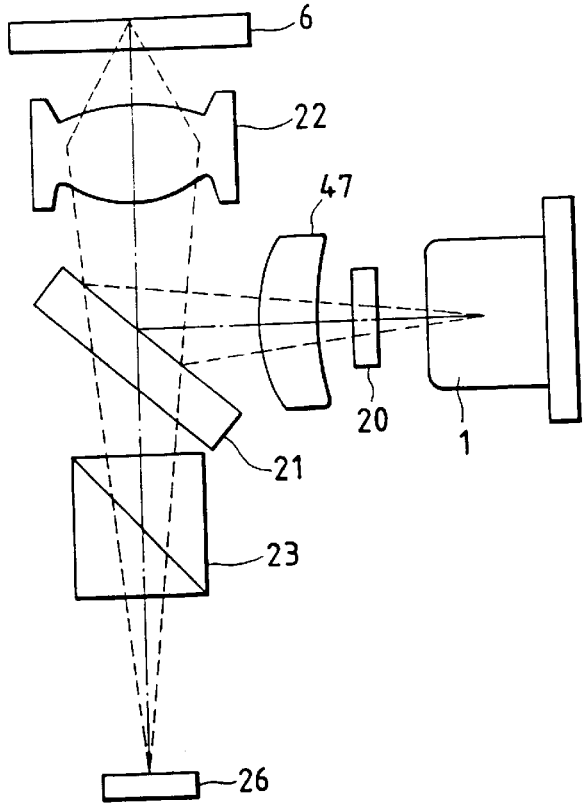
FIG. 9 is a diagram showing a magneto-optical pickup device according to a second embodiment of the present invention.

Referring to FIG. 9, there is provided a diagram showing a magneto-optical pickup device according to a second embodiment of the present invention. The optical pickup device of the second embodiment is characterized in that a positive singlet 47 is additionally provided between the light source 1 and the plate polarizing beam splitter 21. According to this construction, the distance between the light source 1 and the plate polarizing beam splitter 21 can be shortened. Because of this, the size reduction of the optical pickup device and an efficient use of the light beam emitted from the light source 1 as well are realized. For the aberration correction, the positive singlet 47 may be used in addition to the objective lens 22. This indicates an easy aberration correction in the overall optical system of the pickup device. There is no need of using a double glass-joined lens consisting of a pair of spherical lens for the positive singlet 47. It may be a meniscus lens of a spherical single lens, a plano-convex lens, or the like.

Figure 10:
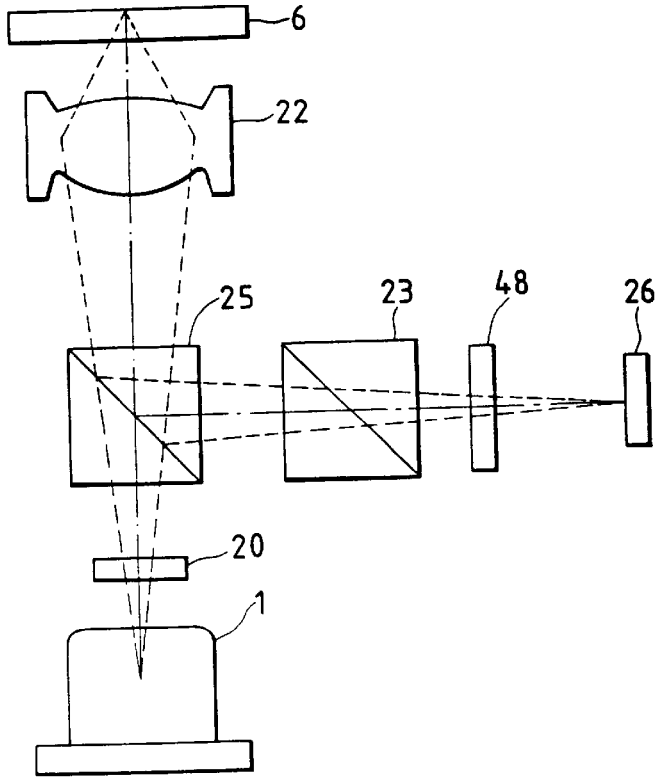
FIG. 10 is a diagram showing a magneto-optical pickup device according to a third embodiment of the present invention.

FIG. 10 is a diagram showing a magneto-optical pickup device according to a third embodiment of the present invention. In the pickup device, a diffraction grating 20 and a prism polarizing beam splitter 25 allow diverging light beams, which are emitted from the light source 1, to pass therethrough to the objective lens 22. The light beams are converted on the magneto-optical disk 6 by the objective lens 22, and reflected thereon. The reflecting light beams travels back through the objective lens 22 and reach the prism polarizing beam splitter 25. The light beams are reflected by the prism polarizing beam splitter 25 and directed toward the Wollaston prism 23. The light beams split by the Wollaston prism 23 pass through the cylindrical lens 48 for forming a focusing error signal, and land on the photo detector unit 26. In this optical pickup device using the prism polarizing beam splitter, the coma of the light beams on the photo detecting unit is smaller than in the pickup device using the plate polarizing beam splitter.

Figure 11A:
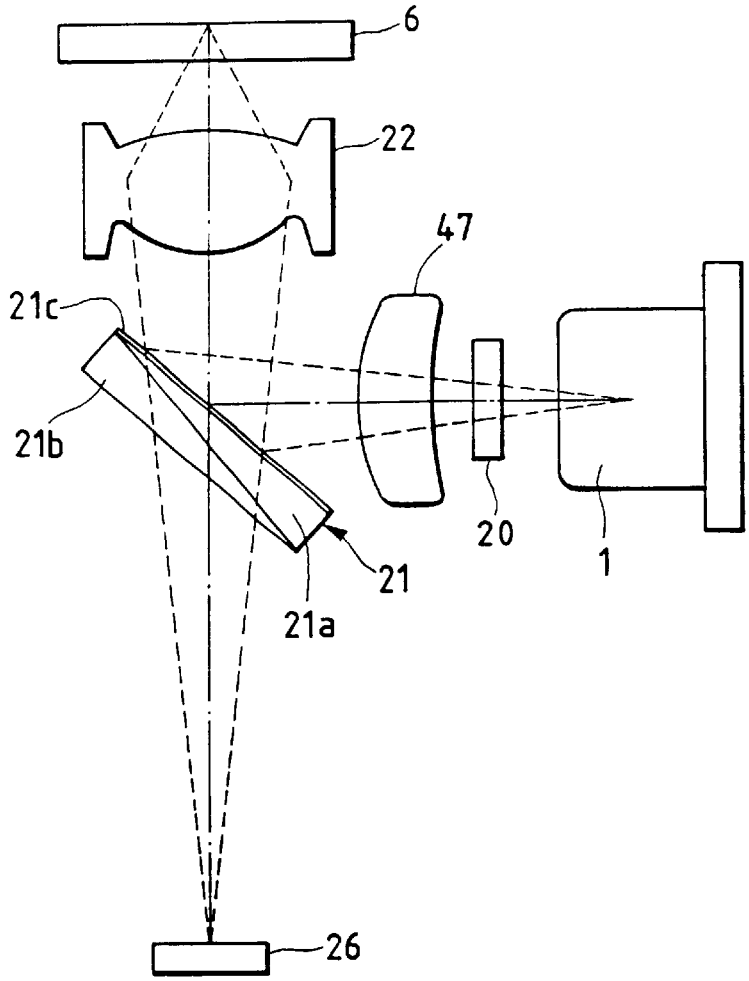
FIG. 11A is a diagram showing a magneto-optical pickup device according to a fourth embodiment of the present invention.

FIG. 11 is a diagram showing a magneto-optical pickup device according to a fourth embodiment of the present invention. In the figure, reference numeral 1 designates a light source as a semiconductor laser device; 20, a diffraction grating for splitting a light beam received from the light source 1 into at least three light beams; 21, a Wollaston prism having a polarizing beam splitting film, which is slanted to the optical axis as already described referring to FIG. 3C; 22, an objective lens; 47, a positive singlet between the diffraction grating 20 and the multifunctional Wollaston prism 21; and 26, a photo detecting unit.

Figure 3A:
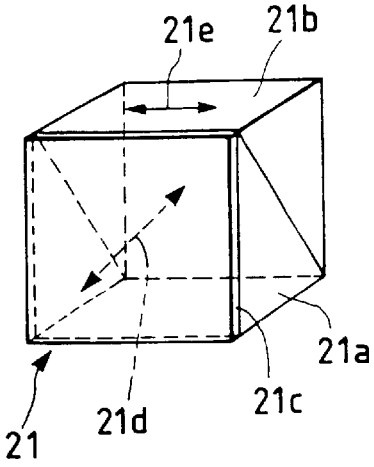
FIG. 3A (PRIOR ART)
FIG. 3A is a perspective view showing a 3-beams Wollaston prism used in an optical pickup device in use with a conventional magneto-optical recording/reproducing system.
Figure 3B:
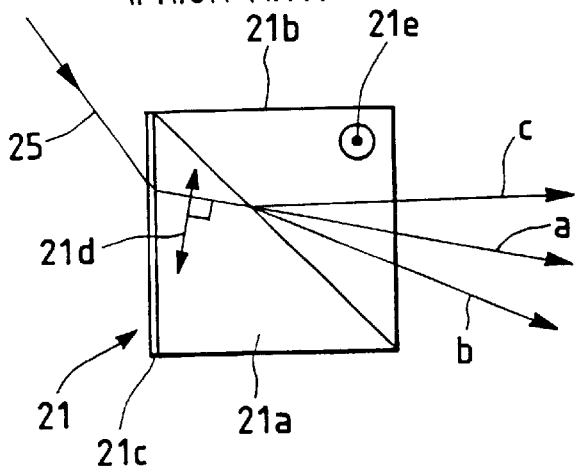
FIG. 3B (PRIOR ART)
FIG. 3B is a side view showing the Wollaston prism shown in FIG. 3A.
Figure 3C:
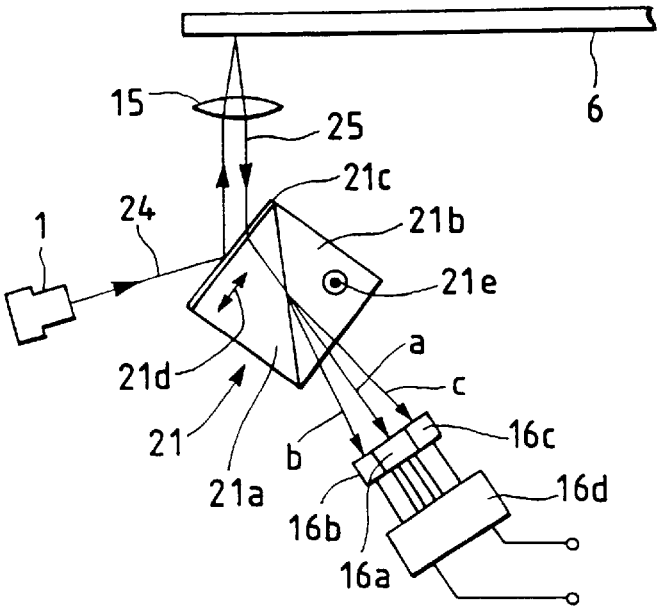
FIG. 3C (PRIOR ART)
FIG. 3C is a diagram showing an arrangement of yet another conventional magneto-optical recording/reproducing pickup device incorporating the Wollaston prism shown in FIGS. 3A and 3B.
Figure 4:
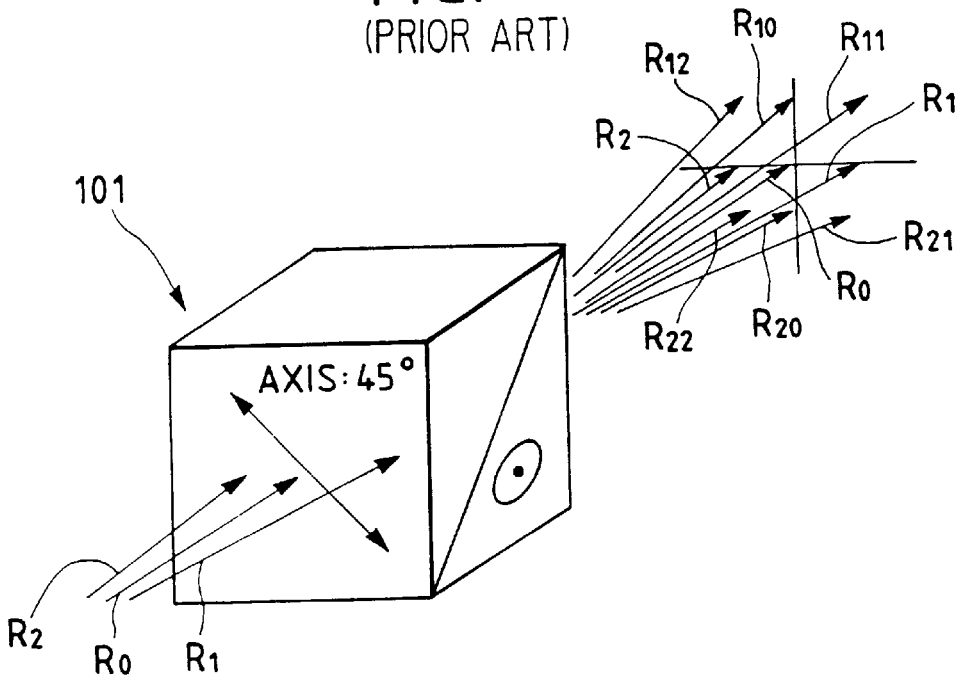
FIG. 4 (PRIOR ART)
FIG. 4 is a perspective view showing a 3-beams Wollaston prism.

The plane grating 20 receives the light beams from the light source 1 and generates a main beam and two subbeams located on both sides of the main beam, which are to be incident on the signal surface of the magneto-optical disk. These main and subbeams are used for forming a tracking error signal. The positive singlet 47, which reduces a degree of divergence of the light beams from the light source 1, allows the light beams to travel to the Wollaston prism 21. The polarizing light splitting film 21c of the Wollaston prism 21 allows the S polarized light component and the P polarized light component of the linearly polarized light incident thereon to pass therethrough at a preset ratio of them, or reflects those light components at a preset ratio. For example, it allows the P polarized light component of 100% and the S polarized light component of 30% to pass therethrough, and reflects the S polarized light component of 70%. The divergent light beams reflected thereby are directed toward the objective lens 22. The objective lens 22 converges the reflecting light beams on the signal surface of the magneto-optical disk 6. On the signal surface of the magneto-optical disk 6, the plane of polarization of the incident light beam is turned in accordance with a magnetization pattern representative of information recorded in a vertically magnetized film. The reflecting light beams with the turned plane of polarization from the magneto-optical disk 6 pass through the objective lens 22, and are obliquely incident on the Wollaston prism 21 in the form of convergent light beams, and are split by the Wollaston prism. The light beam is split into three light beams a, b, and c by the 3-beams Wollaston prism 21, as shown in FIG. 3B. The information is read out through the comparison of the light beams b and c, as described above. The intensities Ib and Ic of the light beams b and c are changed depending on the direction of the turn of the plane of polarization on the disk surface as follows: Ib>Ic or Ib<Ic. The light intensities Ib and Ic of the light beams are detected by the photo detecting elements 16b and 16c, and the output signals of these detecting elements are compared. The information is discriminated on the basis of the comparison result.

Nine number of light beams a to i landing on the photo detecting unit 26 are distributed as shown in FIG. 8A, as in the first embodiment of the present invention. The circuit of FIG. 8B compares the subbeams d and e to generate a tracking control signal. In the fourth embodiment, the Wollaston prism 21, which is slanted to the optical axis, serves also as a cylindrical lens. Accordingly, a focusing error signal can be obtained as in the first embodiment.

In the fourth embodiment, the positive singlet 47 is provided between the light source 1 and the Wollaston prism 21. Accordingly, the distance between the light source 1 and the plate polarizing beam splitter 21 is reduced. This leads to the size reduction of the optical pickup device, an efficient use of the light beam emitted from the light source 1, and an increase of the output power to the disk 6. For the aberration correction, the positive singlet 47 may be used in addition to the objective lens 22. This indicates an easy aberration correction in the overall optical system of the pickup device. The converging position of the light beams on the photo detecting elements of the photo detecting unit 26 may be adjusted by moving the positive singlet 47 along the optical axis. This positioning is easier than in the case shown in FIG. 3C where the photo detecting elements 16a to 16d are positioned.

In the fourth embodiment, the magnification L2/L1 of the objective lens is preferably −6.0 to −12.0, more preferably −7.0 to −9.0.

Figure 11B:
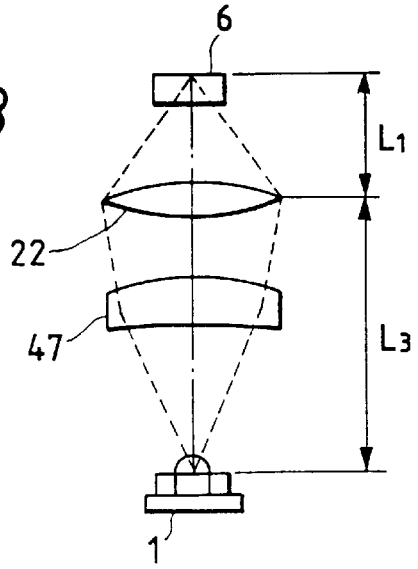
FIG. 11B is an explanatory diagram for explaining an optical system including an objective lens and a positive singlet.

A total magnification L3/L1 of the optical system including the positive singlet 47 is preferably −0.3 to −6.0, more preferably −3.5 to −5.0 (FIG. 11B). If the magnification L3/L1 is smaller than −3.0, the aberration correction is difficult. If it exceeds −6.0, an insufficient quantity of the light is collected from the light source 1, so that a necessary amount of output power to the disk cannot be secured.

Figure 12A:
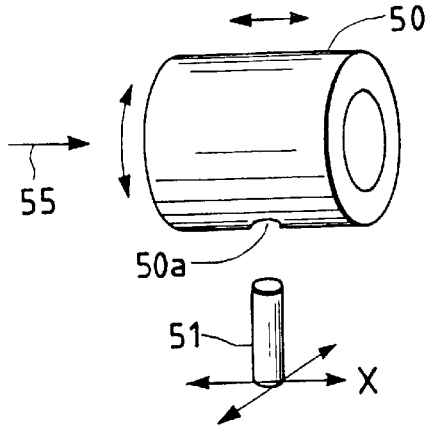
FIG. 12A is a perspective view showing a preferred structure of mounting a diffraction grating and a positive singlet in the optical pickup device of FIG. 11A.
Figure 12B:
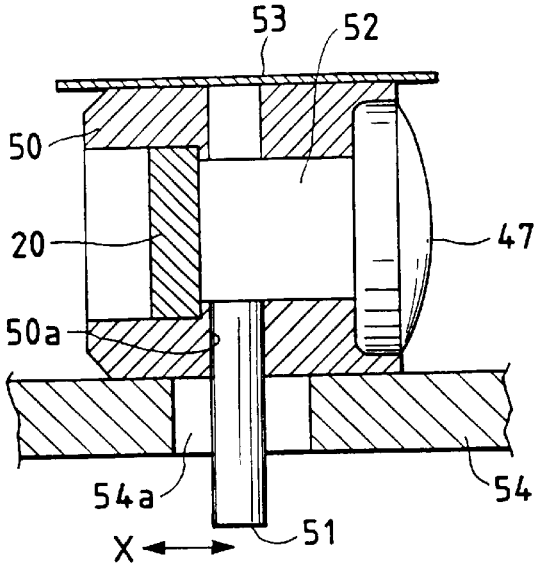
FIG. 12B is a longitudinal sectional view showing the structure of FIG. 12A.
Figure 12C:
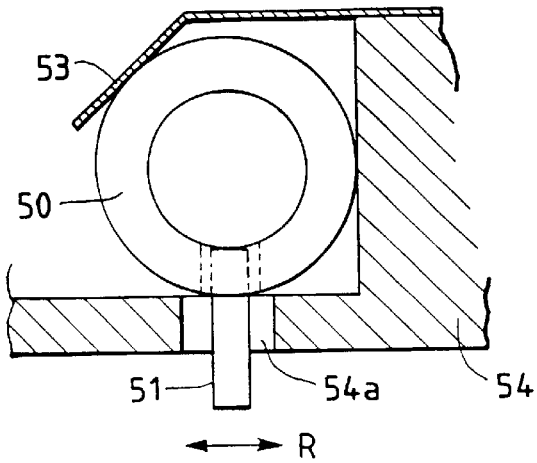
FIG. 12C is a transverse sectional view showing the structure of FIG. 12A.

FIGS. 12A to 12C cooperatively show a preferred structure of mounting the diffraction grating 20 and the positive singlet 47 in the optical pickup device. As shown in FIGS. 12A and 12B, the diffraction grating 20 and the positive singlet 47 are mounted in a tubular case 50 of which the inside 52 is empty. An operation pin 51 is radially attached to the tubular case 50. In this structure, the operational pin 51 is operated in the direction R for the adjustment of the direction (indicated by an arrow R) of the turn of the diffraction grating 20. It is operated in the direction X for the adjustment of the movement of the positive singlet 47 along the optical axis (indicated by X). More specifically, the operational pin 51 is inserted into a hole 50a radially elongated in the tubular case 50. The operational pin 51 is passed through a hole 54a of a housing 54. As shown in FIGS. 12B and 12C, a plate spring 53 secured to the housing 54 presses the tubular case against the corner of the housing 54 in a state that the tubular case is rotatable about its axis and movable in the optical axial direction. In FIG. 12A, reference numeral 55 designates an incident light.

Use of the unit structure of the diffraction grating 20 and the positive singlet 47 brings about various advantageous effects, such as easy assembling, easy adjustment, simple construction.

A fifth embodiment of the present invention will be described.

Figure 1:
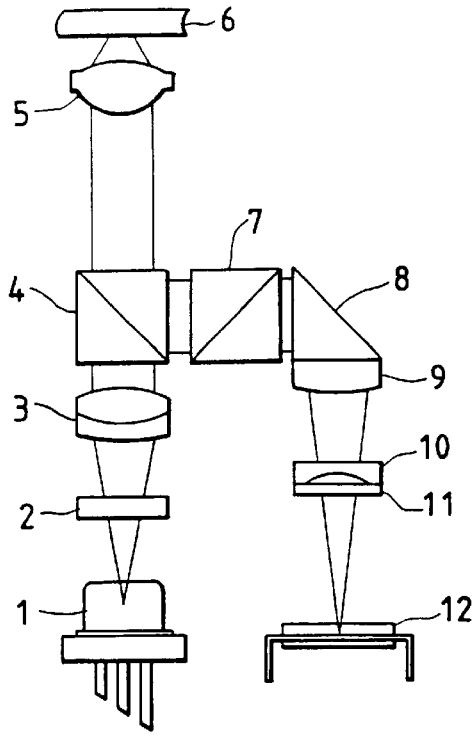
FIG. 1 PRIOR ART
FIG. 1 is a diagram showing an arrangement of a conventional magneto-optical recording/reproducing pickup device.
Figure 13:
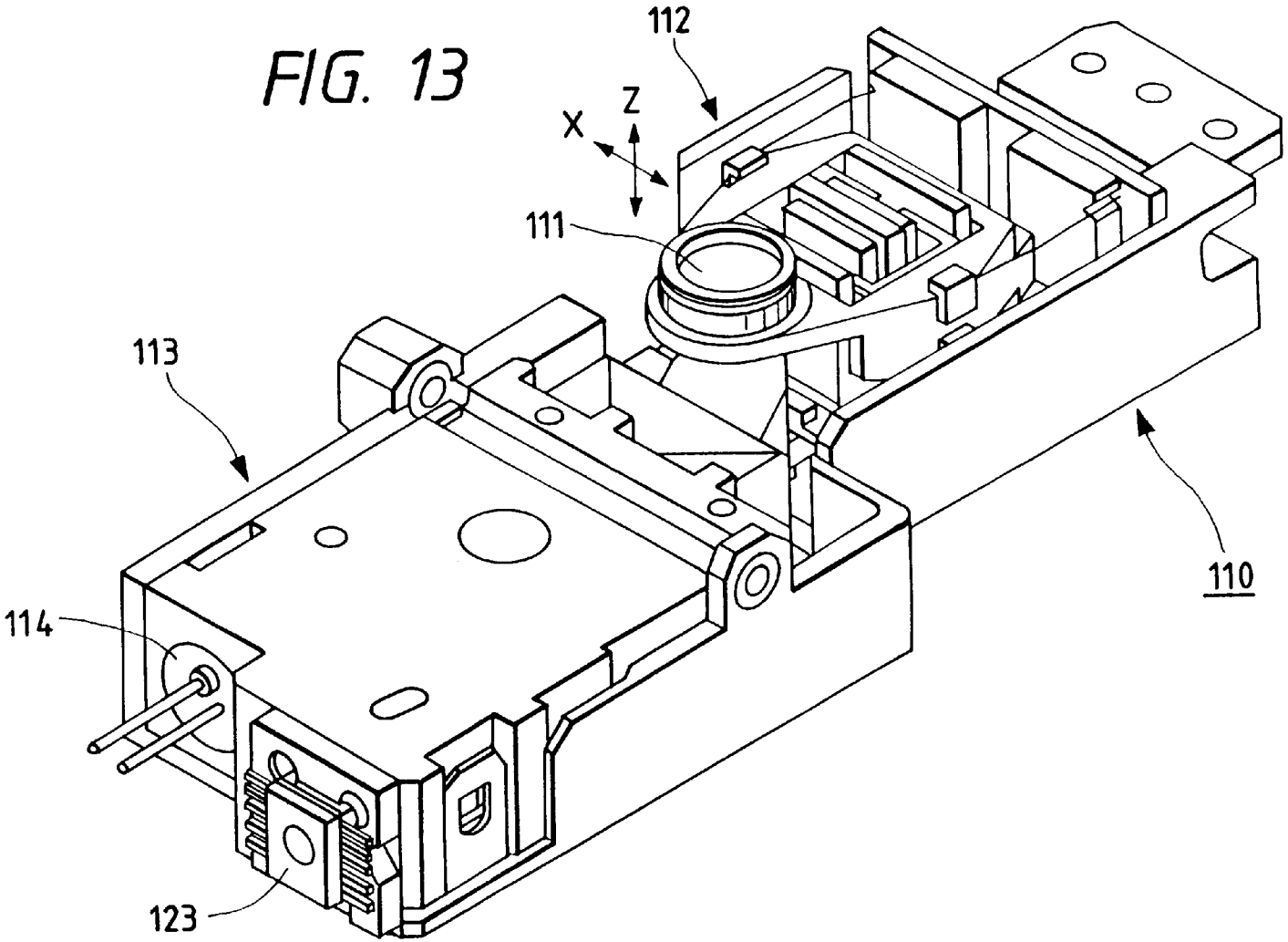
FIG. 13 is a perspective view showing an optical pickup device according to a fifth embodiment of the present invention.
Figure 14:
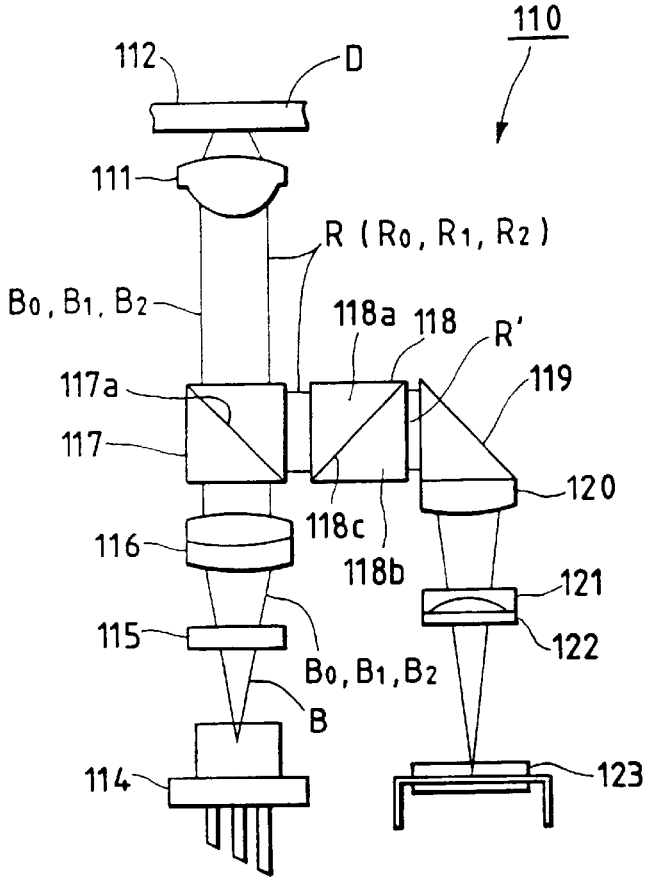
FIG. 14 is a diagram showing an optical system incorporated into the optical pickup device shown in FIG. 13.

FIG. 13 is a perspective view showing an optical pickup device according to a fifth embodiment of the present invention. FIG. 14 is a diagram showing an optical system incorporated into the optical pickup device shown in FIG. 13. The optical system is the same as the optical system using the Wollaston prism of the conventional optical pickup device shown in FIG. 1.

An optical pickup device 110 of the fifth embodiment, as shown in FIG. 13, includes a lens drive unit (lens drive means) 112 for positioning an objective lens 111 to be described later in the focusing direction Z and in the track direction X, and an optical system block 113 containing optical parts the like.

The construction of the optical system block 113 is shown in FIG. 14. In the construction, a semiconductor laser device 114 as a light source generates laser beams B. A diffraction grating 115 receives the laser beams B from the light source 1 and splits them into at least three illumination light beams $B_0$, $B_1$, $B_2$. A collimating lens 116 collimates the three light beams $B_0$, $B_1$, $B_2$ emanating from the diffraction grating 115. A beam splitter 117 changes the direction of the optical axis of the reflecting light beams R ($R_0$, $R_1$, $R_2$) emanating from the objective lens 111. The objective lens 111 receives the illuminating light beams $B_0$, $B_1$, $B_2$ coming through the beam splitter 117 from the light source 1 and converges the light beams on the recording layer (recording portion) on the magneto-optical disk D as a recording medium, and also receives the reflecting light beams $R_0$, $R_1$, $R_2$ from the magneto-optical disk D. A 3-beams Wollaston prism 118 receives the reflecting light beams $R_0$, $R_1$, $R_2$, which are received by the objective lens 111 and the beam splitter 117 and changed in their optical axis by the beam splitter 117, and splits each of those three light beams into three light beams, totally nine light beams R' ($R_0$, $R_1$, $R_2$, $R_{10}$, $R_{11}$, $R_{12}$, $R_{20}$, $R_{21}$, $R_{22}$). A reflecting mirror 119 reflects the reflecting light beams R'. A converging lens 120 converges the reflecting light beams R' reflected by the reflecting mirror 119. A concave lens 121 reduces a converging angle of the reflecting light beams R' incident thereon. A cylindrical lens 122 causes an astigmatism for the reflecting light beams R'. A photo detecting unit 123 detects the reflecting light beams R' transmitted through the cylindrical lens 122.

Figure 15:
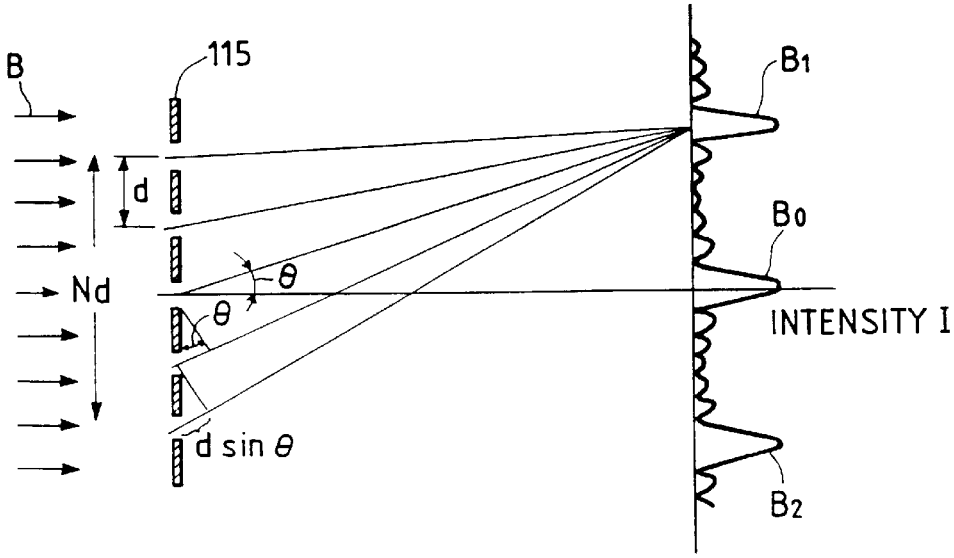
FIG. 15 is a diagram showing the diffraction by a diffraction grating used in the optical system shown in FIG. 14.

The diffraction grating 115, as shown in FIG. 15, diffracts the incident light beams B into at least three illuminating light beams; a 0-th order (of diffraction) light beam $B_0$, a +1st order light beam $B_1$, and a −1st order light beam $B_2$. Of those illuminating light beams $B_0$, $B_1$, $B_2$, the light beams $B_1$ and $B_2$, located on both sides of the light beam $B_0$, are used for generating a so-called tracking error signal.

Figure 16:
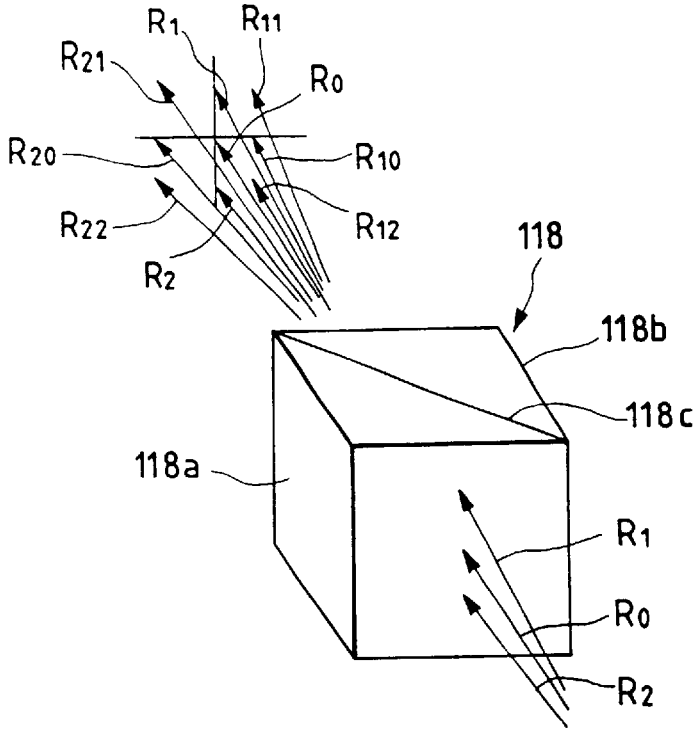
FIG. 16 is a perspective view showing a distribution of light beams by a 3-beam Wollaston prism and a diffraction grating used in the optical system.

The 3-beams Wollaston prism 118, as shown in FIG. 16, is a cubic prism formed by joining a couple of triangle prism 118a and 118b along their slanted surfaces 118c. Each triangle prism, shaped like a right-angled triangle in cross section, is made of a uniaxial crystal, such as quartz, rutile, lithium niobate or calcite. The crystal axes of the triangle prisms 118a and 118b are at right angles to the optical axis of the reflecting light beams R, and at about 45° to each other. When the reflecting light beams $R_0$, $R_1$, $R_2$ pass through the slanted surfaces 118c of the triangle prisms 118a and 118b of the 3-beam Wollaston prism 118, these beams are refracted in different directions depending on the directions of the polarization thereof. As a result, these beams are split into first group of light beams $R_{10}$, $R_{11}$, $R_{12}$ as ordinary ray, a second group of light beams $R_{20}$, $R_{21}$, $R_{22}$ as extraordinary ray, and a third group of light beams $R_0$, $R_1$, $R_2$ as the combination of the ordinary ray and the extraordinary ray.

Figure 17:
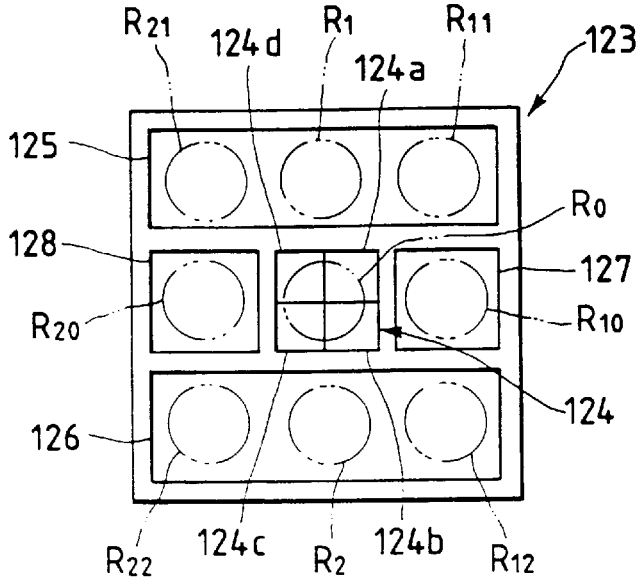
FIG. 17 is a plan view showing the construction of a photo detecting unit used in the optical system.

The photo detecting unit 123 is constructed as shown in FIG. 17. In the photo detecting unit 123, a first photo detecting element 125 receives three reflecting light beams $R_1$, $R_{11}$, $R_{21}$, which are the +1st order (of diffraction) reflecting light beams split by the 3-beams Wollaston prism 118. A second photo detecting-element 126 receives three reflecting light beams $R_2$, $R_{12}$, $R_{22}$, which are the −1st order (of diffraction) reflecting light beams split by the 3-beam Wollaston prism 118. A third photo detecting element 124 consists of 4-divided photo detecting elements 124a to 124d which receive in divided form the central reflecting light beam $R_0$ of three reflecting light beams $R_0$, $R_{10}$, $R_{20}$, which are the 0-th order reflecting light beam split by the 3-beam Wollaston prism 118. Paired fourth photo detecting elements 127 and 128 receive respectively the reflecting light beams $R_{10}$ and $R_{20}$, located on both sides of the central reflecting beam $R_0$. Thus, the reflecting light beams $R_{11}$, $R_{12}$, $R_{21}$, $R_{22}$, which were conventionally not used, can be detected by the photo detecting unit of the invention, so that the tracking error signal having large intensity is output. These photo detecting elements 124a to 124d, and 125 to 128 produce photo detecting signals representative of intensities of the detected reflecting light beams and transfers them to a signal processing unit 130 to be described later, by way of lead wires, not shown.

Figure 18:
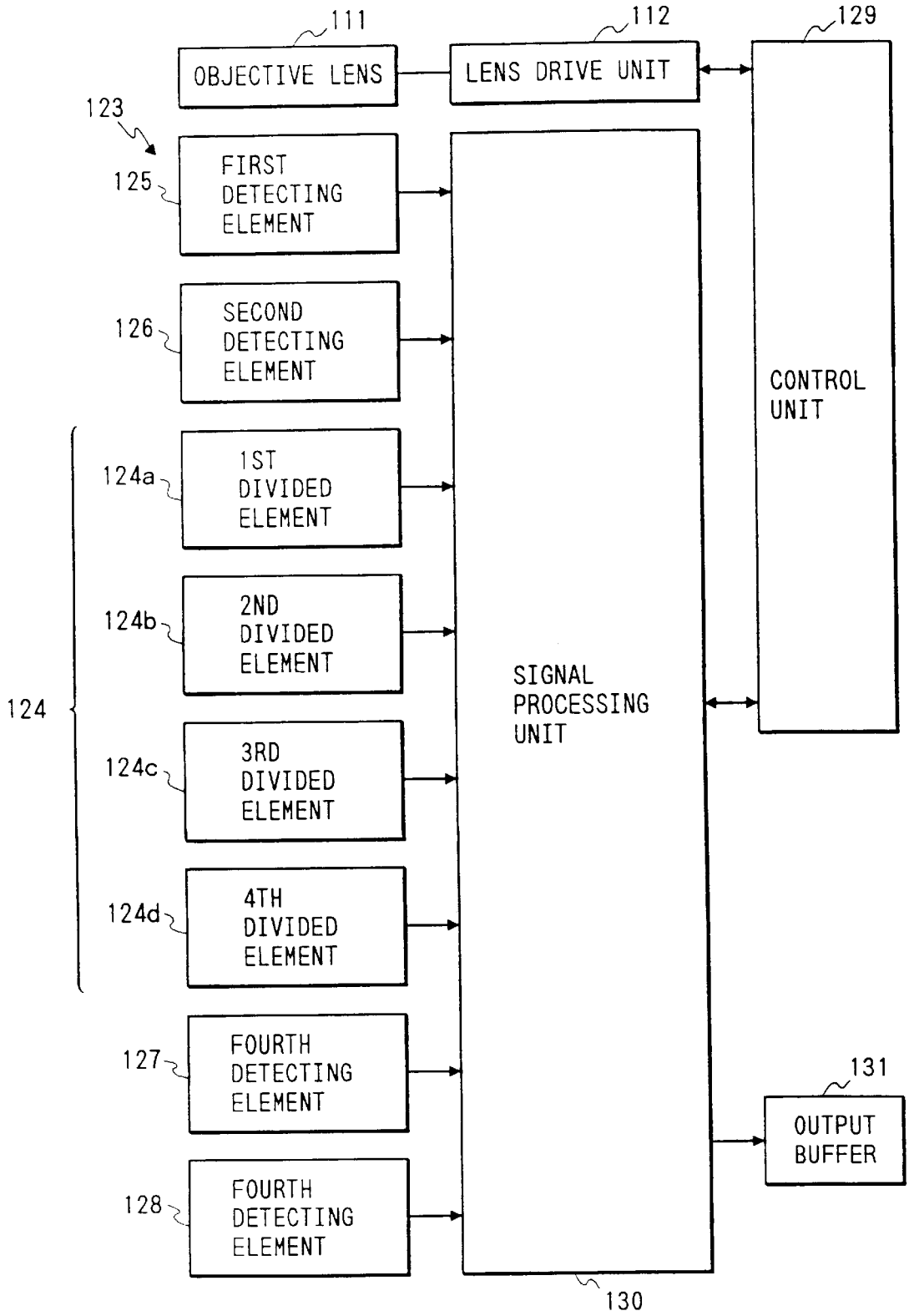
FIG. 18 is a block diagram showing a control system for the optical pickup device of the fifth embodiment.

FIG. 18 is a block diagram showing a control system for the optical pickup device of the fifth embodiment.

The optical pickup device 110 of the present embodiment, as shown, includes a control unit 129 (as control means) for controlling the optical pickup device 110 per se. The control unit 129 is coupled with the lens drive unit 112. The photo detecting elements 134 to 128 are connected through the signal processing unit 130 to the control unit 129.

The signal processing unit 130 generates a tracking error signal and a focusing error signal using the photo detecting signals from the photo detecting elements 124 to 126, and transfers them to the control unit 129. The same generates a magneto-optical signal using the photo detecting signals from the photo detecting elements 127 and 128, and transfers it to an output buffer 131.

The tracking error signal is generated by calculating the difference between the signal from the first photo detecting element 125 which receives the reflecting light beams $R_1$, $R_{11}$, $R_{21}$, and the second photo detecting element 126 which receives the reflecting light beams $R_2$, $R_{12}$, $R_{22}$.

An astigmatism method is used for generating a focusing error signal. A value Fe of the focusing error signal is given by the following equation (1)

$$Fe=(Ra+Rc)-(Rb+Rd) \quad (1)$$

where Ra, Rb, Rc, and Rd are the photo detecting signals from the 4-divided photo detecting elements 124a to 124d.

Figure 19:
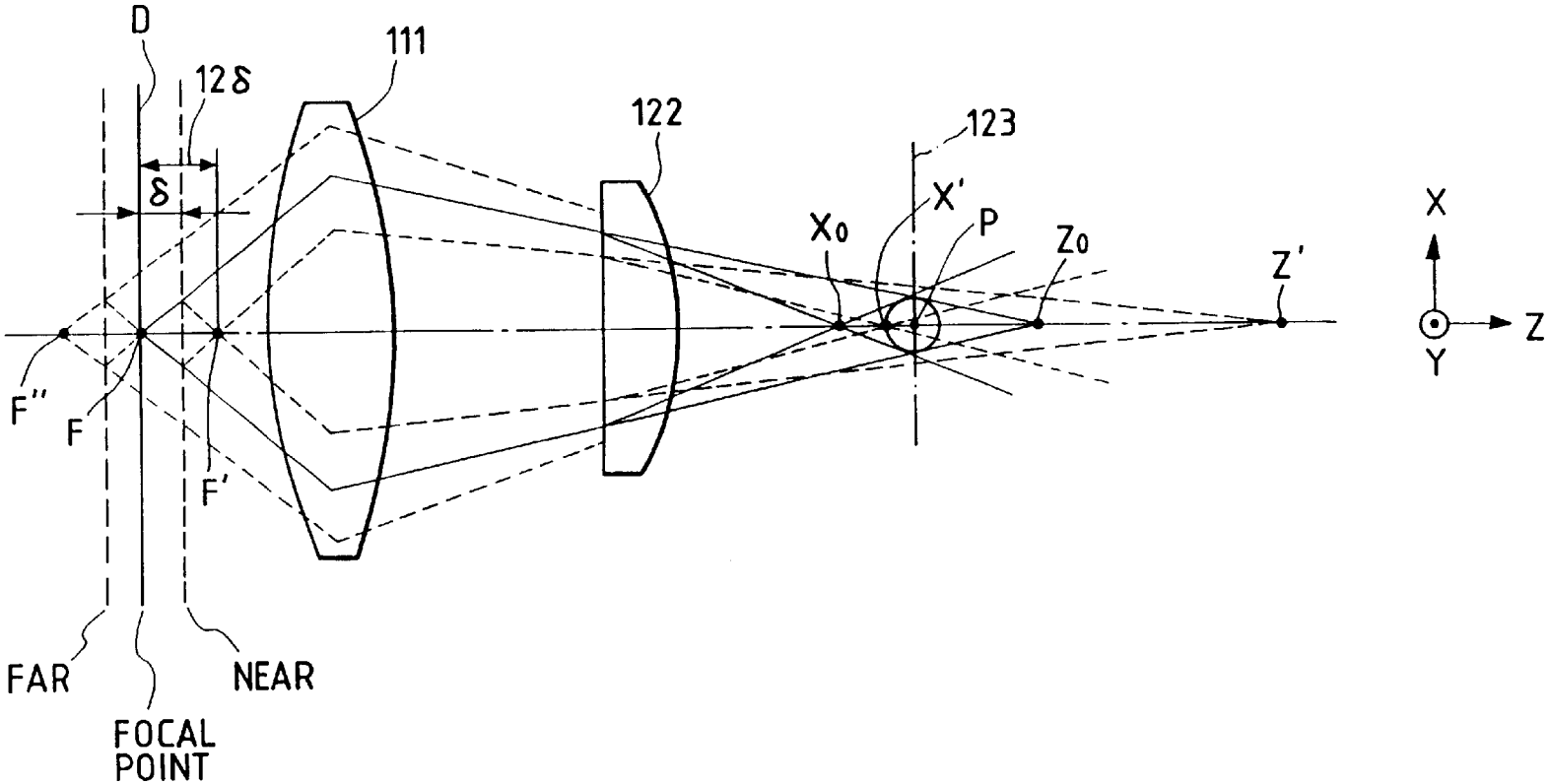
FIG. 19 is a diagram useful in explaining the principle of generating a focusing error signal by a cylindrical lens.
Figure 20A:
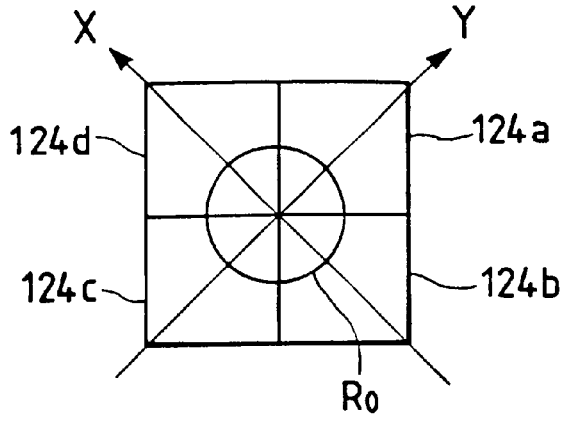
FIG. 20A is a diagram showing a spot formed on a third photo detecting elements-of the photo detecting unit.

As shown in FIG. 19, when the disk D lies at a focal point (indicated by a continuous line), the reflecting light beams from the magneto-optical disk D is focused at a point $Z_0$ when viewed in the Y axis direction perpendicular to the paper surface. The same is focused at a point $X_0$ when viewed in the Y direction parallel to the paper surface. Therefore, the cross section of the beam is circular at a point P. If the 4-divided photo detecting elements 124a to 124d is located at the point P, a circle spot ($R_0$) is formed on the third photo detecting element 124 as shown in FIG. 20A. In an in-focus state, the value Fe of the focusing error signal is 0.

Figure 20B:
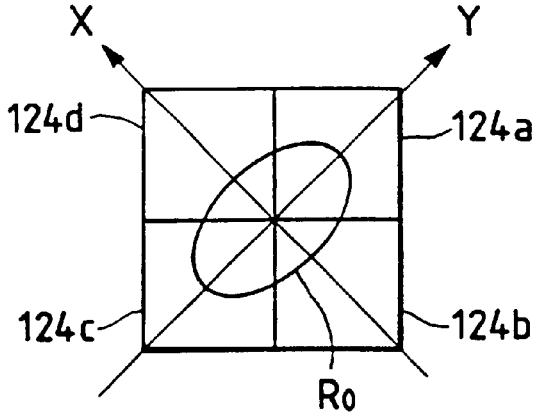
FIG. 20B is a diagram showing another spot formed on a third photo detecting face of the photo detecting unit.

When the objective lens 111 approaches to the disk D (indicated by dotted lines), the focal point moves to a point Z' and X'. The beam cross section at the point P becomes fat in the Y direction, while it becomes thin in the x direction. The spot ($R_0$) on the third photo detecting circuit 124 is an ellipse oblique to the right upper corner in the coordinates shown in FIG. 20B, and the value Fe of the focusing error signal is positive.

Figure 20C:
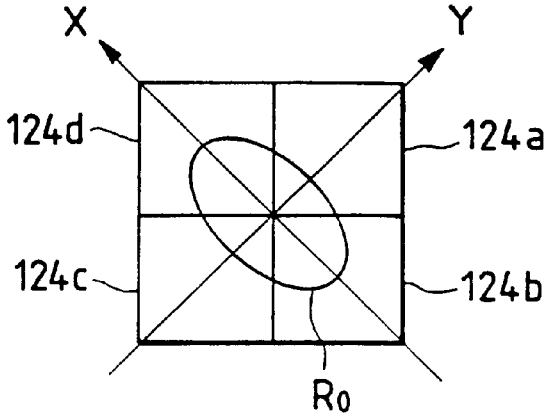
FIG. 20C is a diagram showing yet another spot formed on a third photo detecting face of the photo detecting unit.

When the objective lens 111 is apart from the disk D (indicated by dotted lines), the spot ($R_0$) on the third photo detecting element 124 is an ellipse oblique to the right lower as shown in FIG. 20C, and the value Fe of the focusing error signal is negative.

Figure 21:
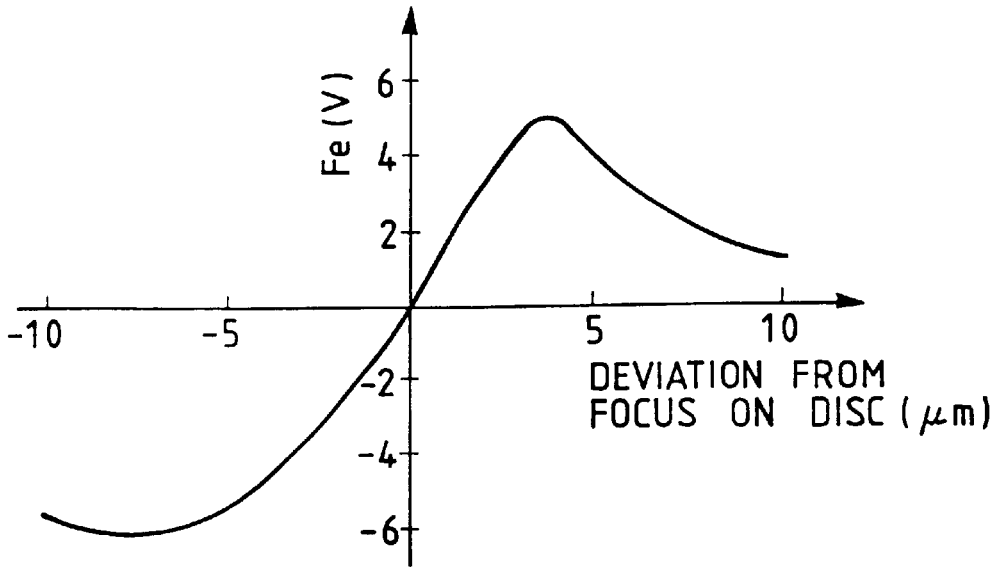
FIG. 21 is a graph showing a variation of a signal value Fe for a focusing error signal with respect to defocusing.

Accordingly, the result of calculating the equation (1) shows a state of the objective lens 111, in-focus, too close to the disk, or too part from the disk. As seen from FIG. 21, one can know a degree of defocusing of the objective lens 111 from the signal value Fe.

The control unit 129 receives a tracking error signal and a focusing error signal from the signal processing unit 130, and controls the lens drive unit 112 in accordance with these signals, and hence moves the objective lens 111 in the focusing direction and the tracking direction, thereby properly positioning the objective lens.

The lens drive unit 112 includes a focusing coil and a tracking coil. Currents controlled by the control unit 129 for the adjustment of properly positioning the objective lens 111, are fed to these coils, whereby the objective lens 111 is moved in the focusing direction X and the tracking direction Z as shown in FIG. 13, and properly positioned.

Of the reflecting light beams $R_0$, $R_{10}$, $R_{20}$, which correspond to the 0-th order reflecting light beams, the reflecting light beams $R_{10}$ and $R_{20}$ are received by the paired fourth photo detecting elements 127 and 128 and the difference between them is calculated, in order to generate a magneto-optical signal in the signal processing unit 130.

Figure 22:
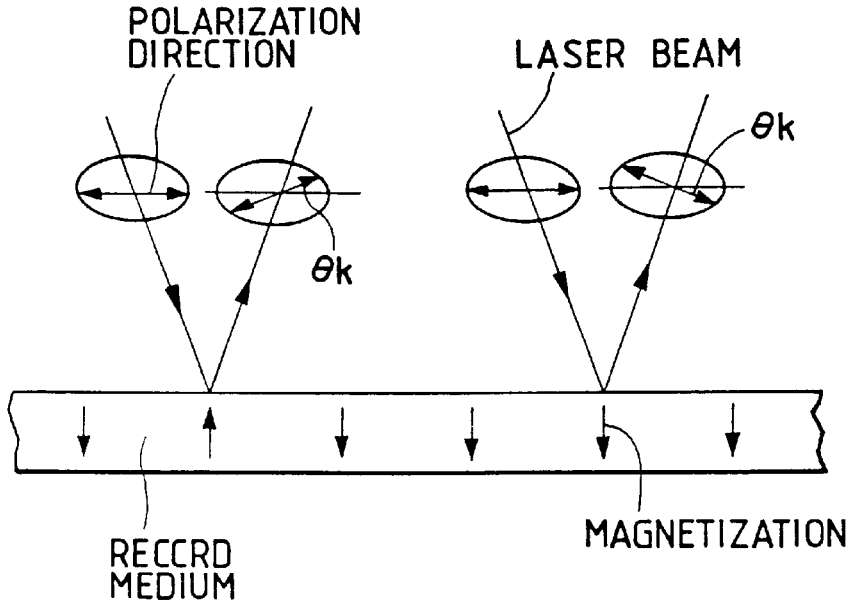
FIG. 22 is a diagram showing the principle of reading data out of a recording layer of a magneto-optical disk.

The operation of the present or fifth embodiment will be described with reference to the related drawings already referred to and FIG. 22.

The laser beams B emitted from the light source 114 are split into first to third illuminating light beams $B_0$, $B_1$, $B_2$ by the diffraction grating 115, and converted into parallel light beams by the collimating lens 116, pass through the beam splitter 117, and are incident on the objective lens 111.

The objective lens 111 converges the illuminating light beams $B_0$, $B_1$, $B_2$ on the recording layer of the magneto-optical disk D.

The recording layer of the magneto-optical disk D is vertically magnetizable. Each magnetic domain of the recording layer is magnetized in its direction. The light beams $B_0$, $B_1$, $B_2$, when reflected on the recording layer, are turned in their planes of polarization in accordance with the directions of the magnetization (this phenomenon is known as the so-called Kerr effect). This phenomenon is illustrated in FIG. 22.

The reflecting light beam R from a magnetic domain in the recording layer where is magnetized in an upward direction (the domain magnetized in the direction indicated by an upward arrow), viz., the magnetic domain storing data "0", has the plane of polarization, which is turned in the plane of polarization by $+\theta_k$ from that of the light beams $B_0$, $B_1$, $B_2$ incident on the recording layer. The reflecting light beam R from a magnetic domain where is magnetized in the direction as the inverted direction (the domain magnetized in the direction indicated by a downward arrow), viz., the magnetic domain storing data "1", has the plane of polarization, which is turned in the plane of polarization by $-\theta_k$ from those of the light beams $B_0$, $B_1$, $B_2$ incident on the recording layer.

Thus, the light beams $B_0$, $B_1$, $B_2$ are incident on the recording layer of the magneto optical disk D, and reflected thereon. The reflecting light beams $R_0$, $R_1$, $R_2$, which are turned in the planes of polarization depending on the content of the data recorded, are incident again on the objective lens 111.

The reflecting light beams $R_0$, $R_1$, $R_2$ are converted into parallel light beams by the objective lens 111, and enter the beam splitter 117. The reflecting surface 117a of the beam splitter 117 directs toward the 3-beams Wollaston prism 118.

The 3-beams Wollaston prism 118 splits each of those three light beams into three light beams, totally nine light beams R' ($R_0$, $R_1$, $R_2$, $R_{10}$, $R_{11}$, $R_{12}$, $R_{20}$, $R_{21}$, $R_{22}$), and these split beams are incident on the reflecting mirror 119.

The reflecting light beams R' are reflected by the reflecting mirror 119, then converged by the converging lens 120, undergo an astigmatism in the cylindrical lens 122, and land on the photo detecting unit 123.

The photo detecting elements 124a to 124d, and 125 to 128 of the photo detecting unit 123 produce photo detecting signals representative of intensities of the detected reflecting light beams and transfers them to the signal processing unit 130.

The signal processing unit 130 generates a tracking error signal, a focusing error signal, and a magneto-optical signal using the photo detecting signals from the photo detecting unit 123, and transfers the tracking error signal and the focusing error signal to the control unit 129, and the magneto-optical signal to an output buffer 131.

The control unit 129 receives a tracking error signal and a focusing error signal from the signal processing unit 130, and controls the lens drive unit 112 in accordance with these signals, an hence moves the objective lens 111 in the focusing direction Z and the tracking direction X, thereby properly positioning the objective lens 111. The magneto-optical signal is used as a reproduced data signal.

Figure 23:
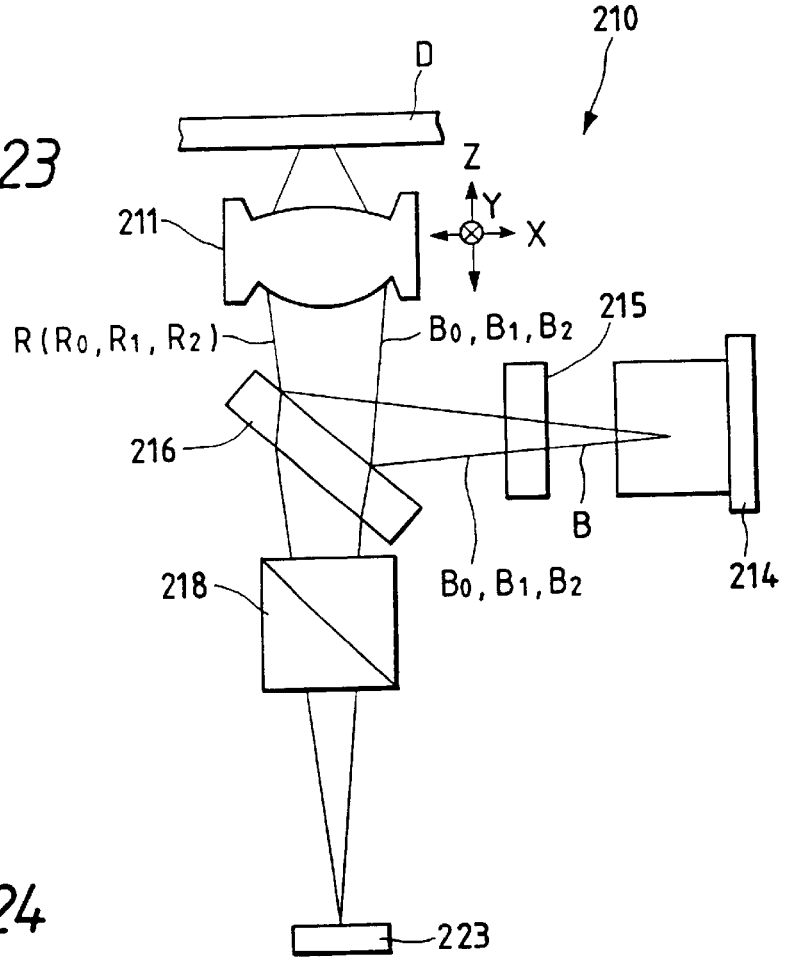
FIG. 23 is a diagram showing an optical system of an optical pickup device incorporating a photo detecting unit according to a sixth embodiment of the present invention.

A photo detecting unit according to a sixth embodiment of the present invention will be described with reference to FIGS. 23 to 28. An optical system shown in FIG. 23 is substantially the same as that of the first embodiment. The operations of a diffraction grating 215, a 3-beam Wollaston prism 218, and the like are substantially the same as those of the corresponding ones in the fifth embodiment shown in FIG. 14. The light beams $B_0$, $B_1$, $B_2$ directed from the diffraction grating 215 to the polarizing light beam splitter 216 are slanted at about 45° with respect to the direction perpendicular to the paper surface in a plane perpendicular to the optical axis.

In the sixth embodiment, the polarizing light beam splitter 216 functions as both a reflecting plate and an astigmatism causing element. The conventional optical pickup device uses a cylindrical lens as an astigmatism causing element and a cubic beam splitter for splitting the reflecting light beam coming from the magneto-optical disk D into a plural number of light beams which in turn strike the photo detecting unit. In this embodiment, one component substitutes for these two components. This contributes to size reduction of the optical pickup device. The deformation direction of the light beams due to astigmatization by the polarizing light beam splitter 216 are oriented in the horizontal X direction and vertical direction Y direction on the photo detecting elements on the photo detecting unit 223 as shown in FIG. 23.

Figure 24:
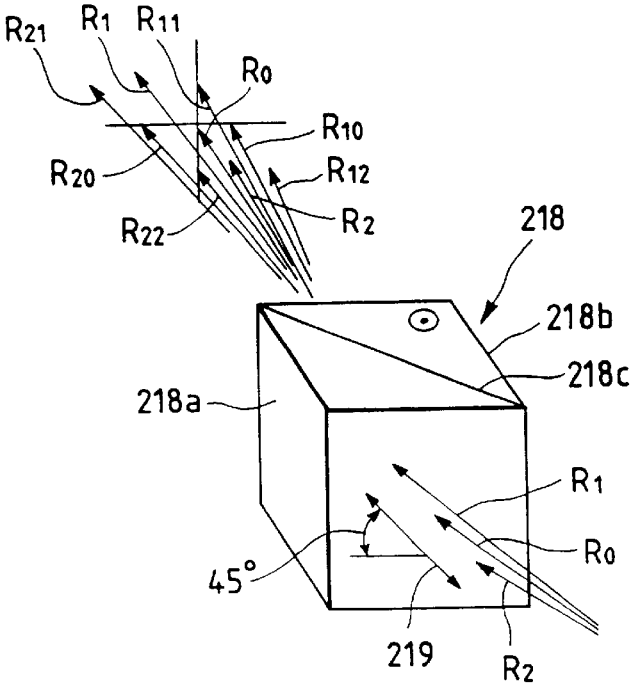
FIG. 24 is a perspective view showing a 3-beam Wollaston prism used in the optical pickup device of FIG. 23.

The 3-beam Wollaston prism 218, as shown in FIG. 24, is a cubic prism formed by joining a couple of triangle prism 218a and 218b along their slanted surfaces 218c. Each triangle prism, shaped like a right-angled triangle in cross section, is made of a uniaxial crystal, such as quartz, rutile, lithium niobate or calcite. The crystal axes of the triangle prisms 218a and 218b are at right angles to the optical axis of the reflecting light beams R, and at about 45°, for example, to each other. The reflecting light beams $R_0$, $R_1$, $R_2$ entering the 3-beams Wollaston prism 218 are those illuminating light beams $B_0$, $B_1$, $B_2$ which are split, while being slanted at about 45°, by the diffraction grating 215 and reflected on the magneto-optical disk D. Accordingly, those light beams are incident on the 3-beam Wollaston prism 218 in a stat that those split light beams are slanted, as shown. When passing through the slanted surfaces 218c of the triangle prisms 218a and 218b of the 3-beam Wollaston prism 218, these beams are refracted in different directions depending on the directions of the polarization thereof. As a result, these beams are split into first group of light beams $R_{10}$, $R_{11}$, $R_{12}$ as a P polarized light component, a second group of light beams $R_{20}$, $R_{21}$, $R_{22}$ as an S polarized light component, and a third group of light beams $R_0$, $R_1$, $R_2$ as the combinations (S+P) of those light components. These split light beams are incident on the photo detecting elements 224 to 228 of the photo detecting unit 223, in the form of a parallelogram.

Figure 5:
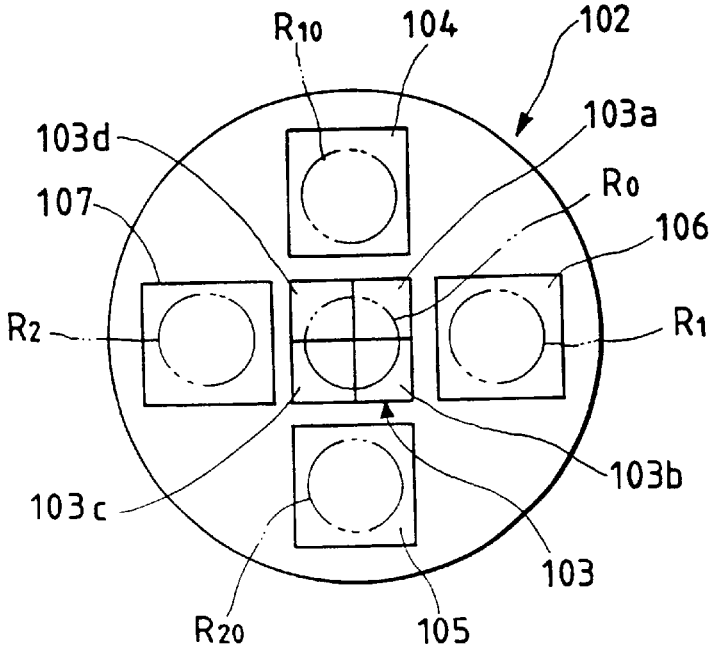
FIG. 5 (PRIOR ART)
FIG. 5 is a plan view showing a conventional photo detecting unit.
Figure 25:
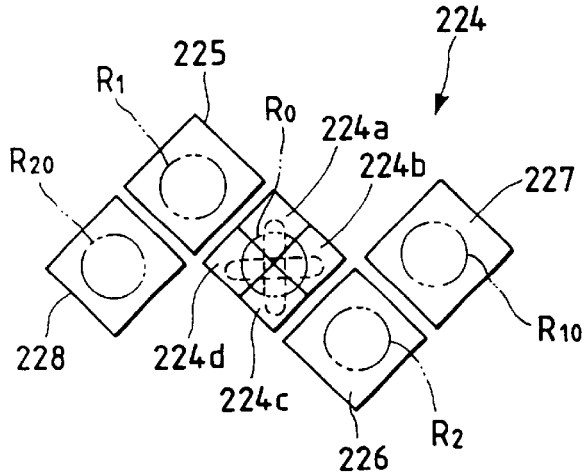
FIG. 25 is a plan view showing a photo detecting unit which is a sixth embodiment of the present invention.

The photo detecting unit 223 is constructed as shown in FIG. 25. In the photo detecting unit 223, a first photo detecting element 225 receives the reflecting light beam $R_1$ of three reflecting light beams $R_1$, $R_{11}$, $R_{21}$, which are split by the 3-beam Wollaston prism 218 and the +1st order (of diffraction) reflecting light beams. A second photo detecting element 226 receives the reflecting light beam $R_2$ of those three reflecting light beams $R_2$, $R_{12}$, $R_{22}$, which are split by the 3-beam Wollaston prism 218 and the −1st order reflecting light beams. A third photo detecting element 224 consists of 4-divided photo detecting elements 224a to 224d which receive in divided form the central reflecting beams $R_0$ of three reflecting light beams $R_0$, $R_{10}$, $R_{20}$, which are split by the 3-beam Wollaston prism 218 and the 0-th order reflecting light beams. Paired fourth photo detecting elements 227 and 228 receive respectively the reflecting light beams $R_{10}$ and $R_{20}$, located on both sides of the central reflecting beam $R_0$. These photo detecting elements 224a to 224d, and 225 to 228 produce photo detecting signals representative of intensities of the detected reflecting light beams and transfers them to a signal processing unit, not shown. Usually, the array of the reflecting light beams $R_{10}$ and $R_{20}$ are perpendicular to that of the reflecting light beams $R_1$ and $R_2$, as shown in FIG. 5. In this embodiment, however, the angle of these arrays is not a right angle. The reason for this follows. The beams deformed through the astigmatism of the polarizing light beam splitter 216 are directed as indicated by dotted lines in FIG. 25. Because of this, the dividing line of the photo detecting element 224 is oblique. Usually, the photo detecting elements 225 and 226 for receiving the light beams for forming a tracking error signal are located on the extension of the dividing line. It is for this reason that the light beams arrays are disposed at an angle, not right angle.

Figure 26:
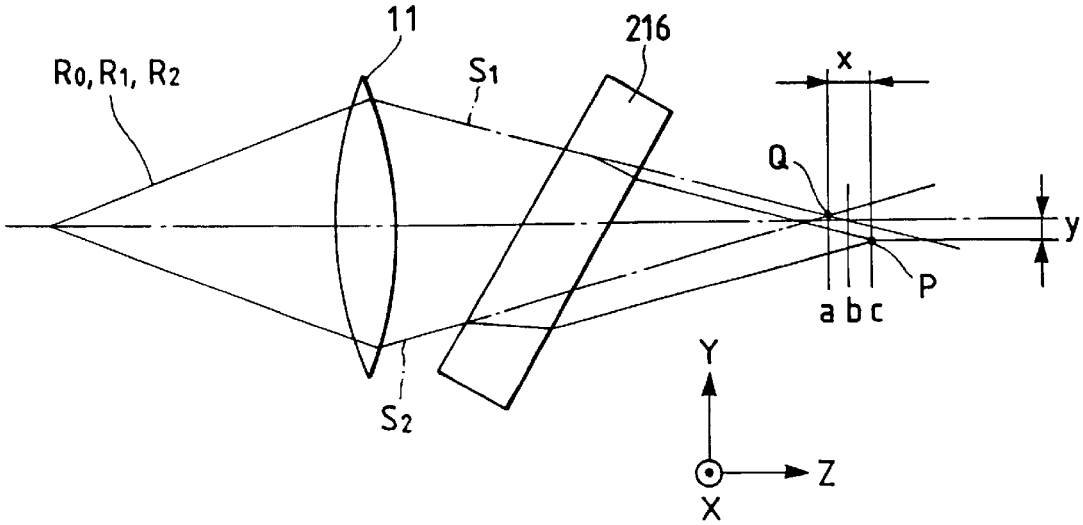
FIG. 26 is a diagram useful in explaining the principle of generating a focusing error signal by a parallel plate slanted with respect to the optical axis.
Figure 27A:
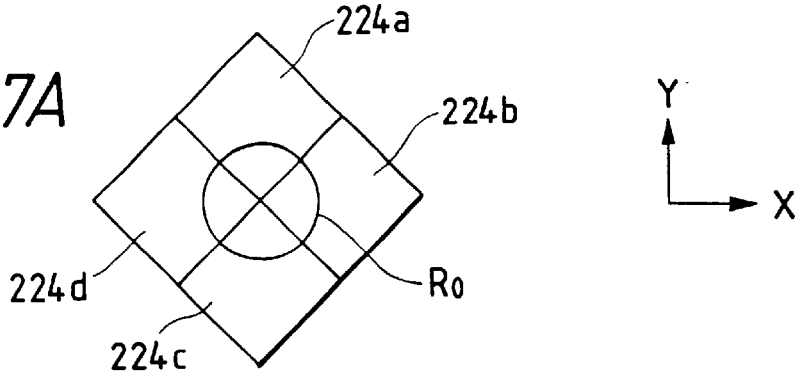
FIG. 27A is a diagram showing a spot formed on a third photo detecting element of the photo detecting unit.

As shown in FIG. 26, the reflecting light beams $R_0$, $R_1$, $R_2$ going to the polarizing light beam splitter 216 are convergent. Because of this, a light beam $S_2$ below than the optical axis is more greatly refracted by the polarizing light beam splitter 216 than a light beam $S_1$ higher than the optical axis. Therefore, a focal point P on the Y-Z plane is at a position displaced a distance y below the optical axis. The light beams $S_1$ and $S_2$ are respectively in parallel with the incident light beams when these beams emanate from the polarizing light beam splitter 216. However, these beams, which should be focused at a point Q, are converged at the point P displaced to the right from the point Q since these are displaced by the refraction. Since the influence of the refraction by the polarizing light beam splitter 216 on the change of the optical paths of the light beams on the X-Z plane is negligible, the paths of the light beams are indicated by one-dot chain lines after the beams are incident on the polarizing light beam splitter 216. It can be considered that the focusing point lies at the point Q on the X-Z plane. Planes perpendicular to the optical axis which contain the points P and Q are denoted as c and a, respectively. A plane as the perpendicular at substantially about midpoint between these planes c and a is denoted as b. The spots (images) in these planes a, b, and c are a circle, and oval segments being perpendicular to each other, respectively as shown in FIG. 27A, 27B, 27C.

Figure 27B:
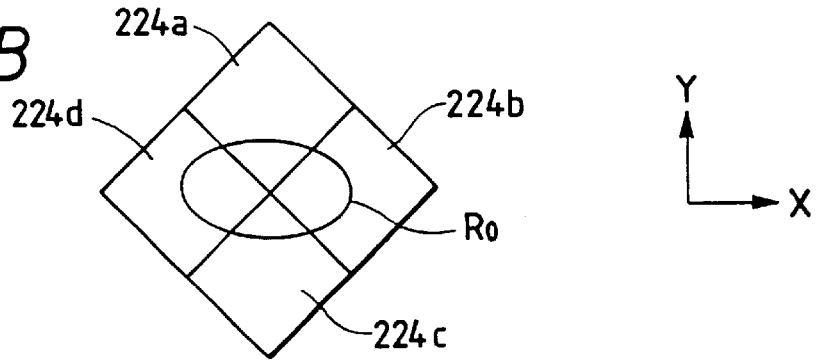
FIG. 27B is a diagram showing another spot formed on a third photo detecting element of the photo detecting unit.
Figure 27C:
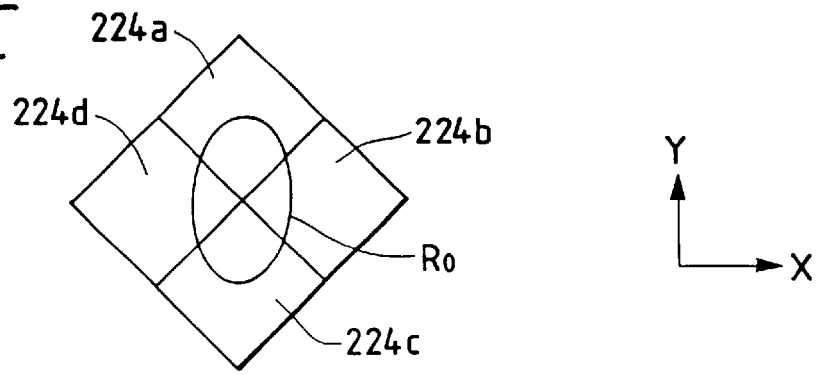
FIG. 27C is a diagram showing yet another spot formed on a third photo detecting element of the photo detecting unit.

Accordingly, if the objective lens 211 is apart from the magneto-optical disk D, the spot is a horizontal ellipse in the plane c as shown in FIG. 27B. The value Fe (Ra+Rc)−(Rb+

Rd) of the focus error signal has a minus sign. If the objective lens 211 approaches to the magneto-optical disk D, the spot is a vertical ellipse in the plane a as shown in FIG. 27C. The value Fe of the focus error signal has a plug sign.

Accordingly, the result of calculating the equation (1) shows a state of the objective lens 211, focus, too near to the disk, or too far from the disk, as in the fifth embodiment. As seen from FIG. 21, one can know a degree of defocusing of the objective lens 211 from the signal value Fe.

The operation of the sixth embodiment will be described.

The laser beams B emitted from the light source 214 are split into first to third illuminating light beams $B_0$, $B_1$, $B_2$ by the diffraction grating 215, and these split light beams are directed toward the objective lens 211 by the polarizing light beam splitter 216.

The objective lens 211 converges the illuminating light beams $B_0$, $B_1$, $B_2$ on the recording surface of the magneto-optical disk D.

Thus, the light beams $B_0$, $B_1$, $B_2$ are incident on the recording layer of the magneto-optical disk D, and reflected thereon. The reflecting light beams $R_0$, $R_1$, $R_2$, which are turned in the plane of polarization depending on the content of the data recorded, are incident again on the objective lens 211.

The reflecting light beams $R_0$, $R_1$, $R_2$ emanate from the objective lens 211, pass through the polarizing light beam splitter 216, and are incident on the 3-beam Wollaston prism 218.

The 3-beam Wollaston prism 218 splits each of those three light beams into three light beams, totally nine light beams R' ($R_0$, $R_1$, $R_2$, $R_{10}$, $R_{11}$, $R_{12}$, $R_{20}$, $R_{21}$, $R_{22}$), and these split beams are incident on the photo detecting unit 223.

The photo detecting elements 224a to 224d, and 225 to 228 of the photo detecting unit 223 produce photo detecting signals representative of intensities of the detected reflecting light beams and transfers them to the signal processing unit.

The signal processing unit generates a tracking error signal, a focusing error signal, and a magneto-optical signal using the photo detecting signals from the photo detecting unit 223, and transfers these signals to the control unit.

The control unit receives a tracking error signal and a focusing error signal from the signal processing unit, and controls the lens drive unit in accordance with these signals, and hence moves the objective lens 211 in the focusing direction Z and the tracking direction, thereby properly positioning the objective lens 211. The magneto-optical signal is used as a reproduced data signal.

Figure 28:
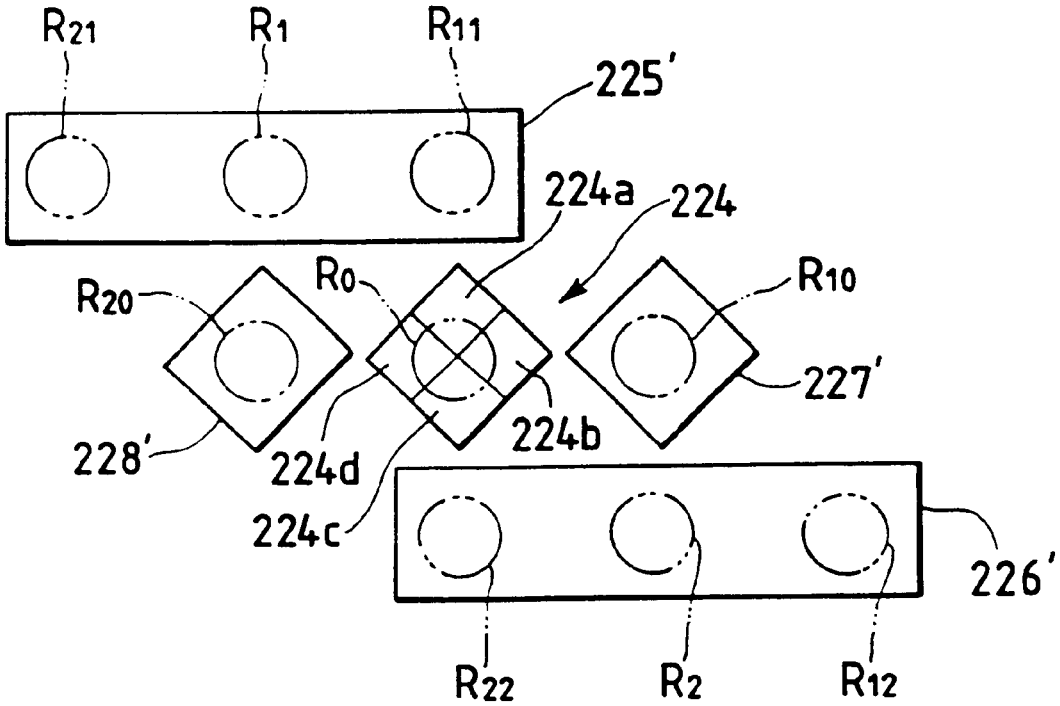
FIG. 28 is a plan view showing a photo detecting unit which is a modification of the sixth embodiment of the present invention.
Figure 29:
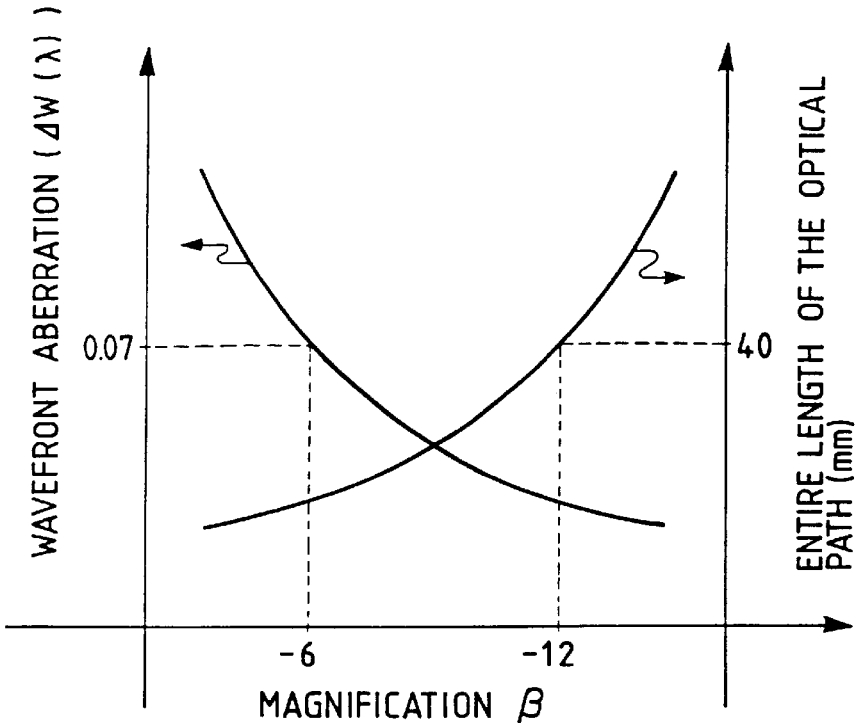
FIG. 29 is a graph showing variations of a wavefront aberration and a magnification β with respect to an entire length of the optical path.
Figure 30:
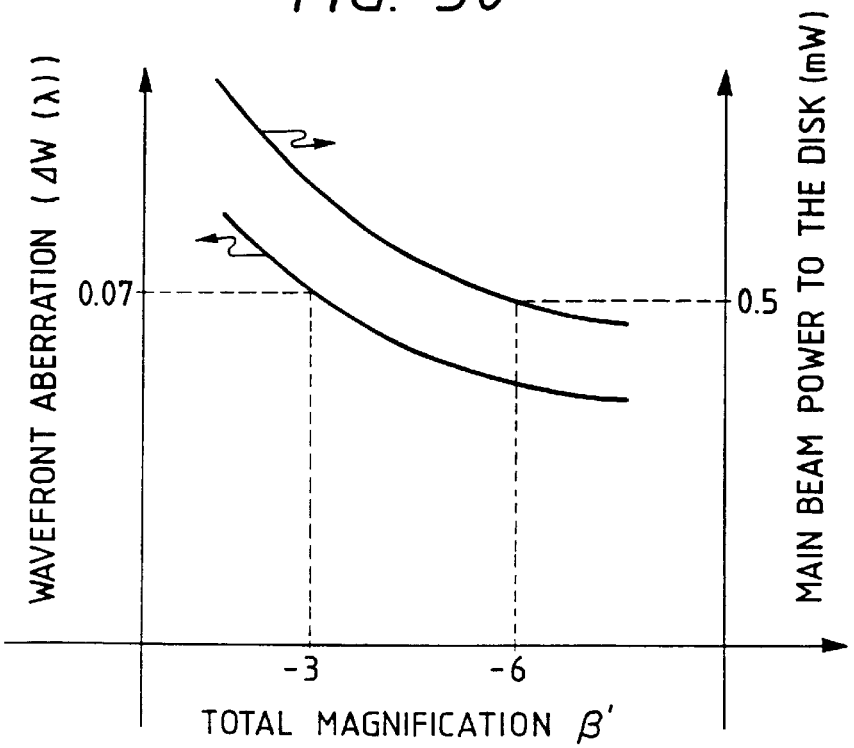
FIG. 30 is a graph showing variations of a wavefront aberration and a total magnification with respect a main beam power to the disk.

The photo detecting unit 223 may also be constructed as shown in FIG. 28. In the photo detecting unit 223, a first photo detecting element 225' receives the reflecting light beams $R_1$, $R_{11}$, $R_{21}$. A second photo detecting element 226' receives the reflecting light beams $R_2$, $R_{12}$, $R_{22}$. A third photo detecting element 224 consists of 4-divided photo detecting elements 224a to 224d which receive in divided form the central reflecting beam $R_0$. Paired fourth photo detecting elements 227' and 228' receive respectively the reflecting light beams $R_{10}$ and $R_{20}$. With this construction, the tracking error signal is more intensified.

It should be understood that the present invention is not limited to the specific embodiments as mentioned above, but may variously be changed, modified, and altered within the scope of the invention. For example, the optical pickup device of the invention may be applied to a magneto-optical disk for mini-disk as a recording medium as well as a magneto-optical disk for MO. In the optical system, the beam splitter for splitting the illuminating light beams and the Wollaston prism may be formed in a single unit construction viz., the multi-functional Wollaston prism.

Figure 2:
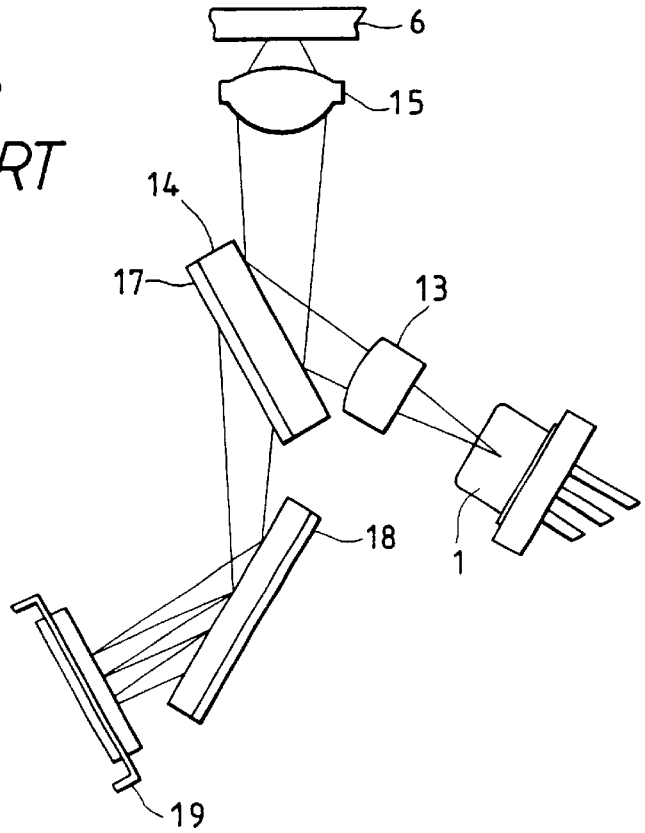
FIG. 2 PRIOR ART
FIG. 2 is a diagram showing an arrangement of another conventional magneto-optical recording/reproducing pickup device.

As seen from the foregoing description, the collimatorless optical system is employed for the magneto-optical recording/reproducing pickup device of the invention. Accordingly, the optical pickup device may be constructed not using the collimating lens and the converging lens. The result is reduction of the number of required parts, simplified construction, and realizing of a compact and low-cost optical pickup device for magneto-optical disk. In the optical pickup device using the Wollaston prism, the angle adjustment is easier than in the optical pickup device using the plate analyzer such as 18 shown in FIG. 2. It is available at low cost. Further, there is no need of using the half-wave plate in constructing the optical pickup device. This feature also contributes to the cost reduction.

Reduction of the distance between the light source and the polarizing beam splitter is possible by employing the positive singlet. Because of this, the size reduction of the optical pickup device and an efficient use of the light beam emitted from the light source as well are realized. For the aberration correction, the positive singlet may be used in addition to the objective lens. This indicates an easy aberration correction in the overall optical system of the pickup device.

Since the multifunctional Wollaston prism having both functions of the polarizing beam splitter and the cylindrical lens is used, the number of required parts is reduced. Further, the positive singlet is provided between the light source and the Wollaston prism. Accordingly, the optical length is reduced. This leads to the size and cost reduction of the optical pickup device, an efficient use of the light beam emitted from the light source, and an increase of the output power to the disk. For the aberration correction, the positive singlet may be used in addition to the objective lens. This indicates an easy aberration correction and easy design of the overall optical system of the pickup device. The converging position of the light beams on the photo detecting elements of the photo detecting unit may be adjusted by moving the positive singlet along the optical axis. The structure is simpler and the position adjustment is easier than in adjusting component with an electrical wiring, such as the photo detecting unit.

Since the diffraction grating and the positive singlet may be formed in a single construction, the assembling work and the adjustment are easy, the construction is simple, moreover.

At least, three reflecting light beams are incident on each of the first and second photo detecting elements. Accordingly, a photo detecting element which can produce a large tracking error signal is realized.

At least, three reflecting light beams are incident on each of the first and second photo detecting elements. Accordingly, an optical pickup device which can produce a large tracking error signal is realized.

A ratio of the 0-th order (of diffraction) light beam to the light beams of the ±1st order light beams is selected within a preset range. Therefore, the present invention succeeds in providing an optical pickup device which can increase the amplitudes of the magneto-optical signal and the focusing error signal.

Since the basic split-light quantity ratio by the 3-beam Wollaston prism is selected within a preset range, an optical pickup device of the present invention can produce a magneto-optical signal having large amplitudes.

An angle between a line connecting the centers of the first and second photo detecting elements and a line connecting the paired fourth photo detecting elements are not a right angle. Accordingly, a photo detecting element well adaptable for an optical system in which the direction of the splitting by the diffraction grating is at an angle, not a right angle, to the direction of the splitting by the Wollaston prism, is realized. Additionally, use of the plate beam splitter reduces the size of the optical pickup device.

What is claimed is:

1. A magneto-optical recording/reproducing pickup device without a collimator, comprising:

a light source for generating light beams;

a diffraction grating for splitting the light beam emitted from the light source into at least three light beams;

an objective lens for converging at leas three light beams emitted from the light source on a magneto-optical recording medium where the at least thee light beams are at least partially reflected forming reflecting light beams, and receiving the reflecting light beams from the recording medium, the magnification of the objective lens being [−6.0 to] *less than* −12.0 when an object point lies at a signal surface of the magneto-optical recording medium;

a beam splitter for separating the light beams coming from the light source and incident on the objective lens from the light beams coming through the objective lens;

a Wollaston prism for splitting the reflecting light beams coming from the magneto-optical recording medium through the beam splitter; and a photo detecting unit including a plural number of photo detecting elements for detecting the light beams emanating from the Wollaston prism.

2. The magneto-optical recording/reproducing pickup device as claimed in claim 1, further comprising a positive singlet for reducing a degree of divergence of the light beams diverging from the light source, which is provided between the light source and the objective lens, the total magnification of the device including the objective lens and the positive singlet being −3.0 to −6.0.

3. The magneto-optical recording/reproducing pickup device as claimed in claim 2, wherein said diffraction grating and said positive singlet are formed in a single construction which is positionally adjustable in a turning direction and an optical axis direction.

4. The magneto-optical recording/reproducing pickup device as claimed in claim 1, wherein a concave lens, movable along an optical axis for focusing the reflecting light beams on the photo detecting element, is provided between the Wollaston prism and the photo detecting element.

5. The magneto-optical recording/reproducing pickup device as claimed in claim 1, wherein the diffraction grating splits the light beams from the light source into the light beams of ±1st order of diffraction and the light beams of 0-th order of diffraction, each of these light beams being split into at least three light beams by the Wollaston prism, the light beams of at least 3×3 being incident on the photo detecting element of the photo detecting unit in the form of a parallelogram, the photo detecting unit includes a first photo detecting element for receiving the light beams of the +1st order of diffraction, a second photo detecting element for receiving the light beams of the −1st order of diffraction, a third photo detecting element, consisting of a plural number of photo detecting elements, for receiving in divided form the central light beam of the three light beams on the 0th order of diffraction, and a pair of fourth photo detecting elements for receiving respectively the reflecting light beams located on both sides of the central reflecting beam of the three light beams split by the Wollaston prism of the 0-th order, and an angle between a line connecting the centers of the first and second photo detecting elements and a line connecting the paired fourth photo detecting elements is not a right angle.

6. The magneto-optical recording/reproducing pickup device as claimed in claim 1, wherein the diffraction grating splits the light beams from the light source into the light beams of ±1st order of diffraction and the light beam of 0-th order of diffraction, each of these light beams being split into at least three light beams by the Wollaston prism, the light beams of at least 3×3 being incident on the photo detecting elements of the photo detecting unit, and the photo detecting unit includes a first photo detecting element for receiving at least three light beams of the +1st order of diffraction, a second photo detecting element for receiving at least three light beams of the −1st order of diffraction, a third photo detecting element, consisting of a plural number of photo detecting elements, for receiving in divided form the central light beam of the three light beams of the 0-th order of diffraction, and a pair of fourth photo detecting elements for receiving respectively the reflecting light beams located on both sides of the central reflecting beam of the three light beams split by the Wollaston prism of the 0-th order of diffraction.

7. The magneto-optical recording/reproducing pickup device as claimed in claim 6, wherein the ratio of the quantities of the 0th order to ±1st order of diffraction, caused by the diffraction grating, is set within a range of 8.5 to 15.

8. The magneto-optical recording/reproducing pickup device as claimed in claim 6, wherein the Wollaston prism splits the received light beams into an ordinary ray, an extraordinary ray, and a light beam as the combination of the ordinary ray and extraordinary ray, and the ratio of the quantities of the ordinary ray and the extraordinary ray to the whole light quality is within 30 to 45%.

9. The magneto-optical recording/reproducing pickup device according to claim 1, in which the magnification of the objective lens is within −7.0 to −9.0.

10. A magneto-optical recording/reproducing pickup device without a collimater comprising:

a light source for generating light beams;

a diffraction grating for splitting the light beam emitted from the light source into at least three light beams;

an objective lens for converging at least three light beams emitted from the light source on a magneto-optical recording medium where the at leas three light beams are at least partially reflected forming reflecting light beams, and receiving the reflecting light beams from the recording medium, the magnification of the objective lens being [−6.0 to] *less than* −12.0 when an object point lies at a signal surface of the magneto-optical recording medium;

a Wollaston prism for causing an astigmatism including a polarizing light splitting film for separating the light beams coming from the light source and incident on the objective lens for the light beams coming through the objective lens, the Wollaston prism being composed of a first prism joined to a second prism made of crystal, a plane including the optical axis of the reflecting light beam coming in through the objective lens and the optic axis of the first prism, is at an angle, not a right angle, to a plane including that optical axis and the optic axis of the second prism, the Wollaston prism is disposed in the optical path of the reflecting light beams as light beams being convergent and not parallel in a state that is slanted with respect to the optical axis, whereby causing an astigmatism, a positive singlet provided between the light source and the objective lens, the total magnification of the device including the objective lens and the positive singlet being −3.0 to −6.0; and a photo detecting unit including a plural number of photo detecting elements for detecting the light beams emanating from the Wollaston prism.

11. The magneto-optical recording/reproducing pickup service device as claimed in claim 10, wherein the diffraction grating and the positive singlet are formed in a single construction which is positionally adjustable in a turning direction and an optical axis direction.

12. The magneto-optical recording/reproducing pickup device as claimed in claim 10, in which the diffraction grating splits the light beams from the light source into light beams of ±1st order of diffraction and a light beam of 0-th order of diffraction, each of these light beams being split into at least three light beams by the Wollaston prism, the light beams of at least 3×3 being incident on the photo detecting elements of the photo detecting unit in the form of a parallelogram, the photo detecting unit includes a first photo detecting element for receiving the light beams of the +1st order of diffraction, a second photo detecting element for receiving the light beams of the −1st order of diffraction, a third photo detecting element, consisting of a plural number of photo detecting elements, for receiving in divided form the central light beam of the three light beams of the 0-th order of diffraction, and a pair of fourth photo detecting elements for receiving respectively the reflecting light beams located on both sides of the central reflecting beam of the three light beams split by Wollaston prism of 0-th order of diffraction, and an angle between a line connecting the centers of the first and second photo detecting elements and a line connecting the paired fourth photo detecting elements is not a right angle.

13. The magneto-optical recording/reproducing pickup device as claimed in claim 10, wherein the diffraction grating splits the light beams from the light source into light beams of ±1st order of diffraction and a light beam of 0-th order of diffraction, each of these light beams being split into at least three light beams by the Wollaston prism, the light beams of at least 3×3 being incident on the photo detecting elements of the photo detecting unit, and the photo detecting unit includes a first photo detecting element for receiving at least three light beams of the +1st order of diffraction, a second photo detecting element for receiving at least three light beams of the −1st order of diffraction, a third photo detecting element, consisting of a plural number of photo detecting elements, for receiving in divided form the central light beam of the three light beams of the 0-th order of diffraction, and a pair of fourth photo detecting elements for receiving respectively the reflecting light beams located on both sides of the central reflecting beam of the three light beams split by the Wollaston prism of the 0-th order of diffraction.

14. The magneto-optical recording/reproducing pickup device as claimed in claim 13, wherein the ratio of the quantities of the 0-th order to ±1st order of diffraction, caused by the diffraction grating, as set within a range of 8.5 to 15.

15. The magneto-optical recording/reproducing pickup device as claimed in claim 13, wherein the Wollaston prism splits the received light beams into an ordinary ray, an extraordinary ray, and a light beam as the combination of the ordinary ray and extraordinary ray, and the ratio of the quantities of the ordinary ray and the extraordinary ray to the whole light quantity is within 30 to 45%.

16. The magneto-optical recording/reproducing pickup device as claimed in claim 10, wherein the magnification of the objective lens is within −7.0 to −9.0.

17. A photo detecting unit for receiving the reflecting the light beams formed in a manner that a light beam is split into at least three light beams of 0-th order and ±1st order of diffraction by a diffraction grating, the split light beams are incident on a recording medium without using a collimator, the light beams reflected on the recording medium are each split into at least three light beams by a Wollaston prism, said photo detecting unit comprising:

a first photo detecting element for receiving the light beams of the +1st order of diffraction; and a second photo detecting element for receiving the light beams of the −1st order of diffraction.

18. A magneto-optical recording/reproducing pickup device without a collimator comprising:

a light source for generating light beams;

a diffraction grating for splitting a light beam emitted form the light source into at least three light beams of 0-th order and ±1st order of diffraction;

an objective lens for converging the at least three light beams split by the diffraction grating on a recording medium, and receiving the reflecting light beams from the recording medium where the at least three light beams are at least partially reflected forming reflecting light beams;

a Wollaston prism for splitting the reflecting light beams coming in through the objective lens into at least three light beams;

a photo detecting unit for receiving at least nine reflecting light beams from the Wollaston prism, said photo detecting unit including a first photo detecting element for receiving at leas three light beams of the +1st order of diffraction, a second photo detecting element for receiving at least three light beams of the −1st order of diffraction, a third photo detecting element, consisting of a plural number of photo detecting elements, for receiving in divided form the central light beam of the three light beams of the 0-th order of diffraction, and a pair of fourth photo detecting elements for receiving respectively the reflecting light beams located on both sides of the central reflecting beam of the three light beams split by the Wollaston prism of the 0-th order of diffraction; and lens drive means for driving the objective lens for positioning adjustment.

19. The magneto-optical recording/reproducing pickup device as claimed in claim 18, wherein the ratio of the quantities of the 0th order to ±1st order of diffraction, caused by the diffraction grating, is set within a range of 8.5 to 15.

20. The magneto-optical recording/reproducing pickup device as claimed in claim 18, wherein the Wollaston prism splits the received light beams into an ordinary ray, an extraordinary ray, and a light beam as the combination of the ordinary ray and extraordinary ray, and the ratio of the quantities of the ordinary ray and the extraordinary ray to the whole light quantity is within 30 to 45%.

* * * * *